US012767215B2

(12) United States Patent
Anumula et al.

(10) Patent No.: US 12,767,215 B2
(45) Date of Patent: Oct. 20, 2026

(54) HOMING OF STEERING UNITS FOR AUTOMATED VEHICLES

(71) Applicant: Toyota Automated Logistics Americas, LLC, Carmel, IN (US)

(72) Inventors: Ashok Anumula, Missouri City, TX (US); Michael Marcum, Georgetown, KY (US); Charles Thomas Quinlan, III, Meridian, ID (US); Gabriel Michael Riggs, Boise, ID (US)

(73) Assignee: Toyota Automated Logistics Americas, LLC, Carmel, IN (US)

( * ) Notice: Subject to any disclaimer, the term of this patent is extended or adjusted under 35 U.S.C. 154(b) by 314 days.

(21) Appl. No.: 18/603,440

(22) Filed: Mar. 13, 2024

(65) Prior Publication Data

US 2024/0308575 A1 Sep. 19, 2024

Related U.S. Application Data

(60) Provisional application No. 63/490,109, filed on Mar. 14, 2023.

(51) Int. Cl.
*B62D 5/04* (2006.01)

(52) U.S. Cl.
CPC .................................. *B62D 5/0466* (2013.01)

(58) Field of Classification Search
CPC ......................... B62D 5/0466; B62D 15/0245; B62D 15/023; B62D 5/0418; B62D 7/04; B66F 9/063; B66F 9/07568
See application file for complete search history.

(56) References Cited

U.S. PATENT DOCUMENTS 6,155,106 A * 12/2000 Sano .................... G01D 5/2451 73/117.02
11,365,984 B2 * 6/2022 Osada ...................... G01D 5/14
12,044,551 B2 * 7/2024 Saito .................... G01D 5/2497
(Continued)

FOREIGN PATENT DOCUMENTS

CN 211764900 U 10/2020
CN 110550579 B * 5/2021 ............ B66F 17/003
(Continued)

OTHER PUBLICATIONS

PCT, Int. App. No. PCT/US2024/019651 International Search Report, 4 pages, Jun. 28, 2024.
(Continued)

*Primary Examiner* — Drew J Brown
(74) *Attorney, Agent, or Firm* — Woodard, Emhardt, Henry, Reeves, and Wagner, LLP

(57) ABSTRACT

A forklift system includes a steering system. The steering system includes a steer arm. A controller is operatively coupled to the steering system, and a homing system is configured to determine a home position of the steering system. The homing system is configured to determine the home position by rotating the steer arm in a single direction, such as in a clockwise or counterclockwise direction. In one variation, the homing system includes at least two sensors and at least two encoders. The sensors are configured to detect a target coupled to the steering system, and the encoders are configured to measure the angular rotation of the steering system.

20 Claims, 27 Drawing Sheets

(56) References Cited

U.S. PATENT DOCUMENTS

| | | | | |
|---|---|---|---|---|
| 2005/0247508 | A1* | 11/2005 | Gilliland | B66F 9/07568 180/19.1 |
| 2007/0175697 | A1 | 8/2007 | Choi | |
| 2014/0262593 | A1* | 9/2014 | Castaneda | B62B 3/06 180/446 |
| 2024/0308575 | A1* | 9/2024 | Anumula | B62D 5/0466 |

FOREIGN PATENT DOCUMENTS

| | | | | |
|---|---|---|---|---|
| CN | 213291976 | U | 5/2021 | |
| CN | 213779063 | U | 7/2021 | |
| DE | 102015118749 | A1 * | 5/2017 | B62D 15/021 |
| KR | 20100057132 | A | 5/2010 | |

OTHER PUBLICATIONS

PCT, Int. App. No. PCT/US2024/019651 Written Opinion of International Search Authority, 5 pages, Jun. 28, 2024.

* cited by examiner

HOMING OF STEERING UNITS FOR AUTOMATED VEHICLES

CROSS REFERENCE TO RELATED APPLICATIONS

This application claims the benefit of U.S. patent application Ser. No. 63/490,109, filed Mar. 14, 2023, which is hereby incorporated by reference.

BACKGROUND

Forklift trucks and other vehicles are commonly used in warehouses and manufacturing plants as well as in other environments to move, stack, and unstack various items. Due to the cramped conditions in these environments, steering forklift trucks, either manually or autonomously, can be difficult. If not properly steered, the forklift truck can damage items, crash, and/or cause injury.

Thus, there is a need for improvement in this field.

SUMMARY

Homing mechanisms for steering units or systems are used on a wide variety of vehicles such as forklift trucks. For instance, honing mechanisms are commonly used in autonomous guided counterbalanced forked vehicles (AGF) and other autonomous guided vehicular (AGV) systems. Specifically, homing mechanisms can be utilized on the steering units of an AGF or an AGV. Homing mechanisms ensure the accuracy of the steering angle, which in turn ensures the accuracy of turning operations of the AGF or the AGV.

For homing sequence operations, various homing mechanisms utilize a single sensor to detect homing positions. In those homing mechanisms, a counterclockwise (CCW) direction will yield a different home position compared to a clockwise (CW) direction. This introduces an error in the homing sequence, which in turn affects the accuracy of the measurement of the steering angle of the AGF or the AGV. A homing system or assembly, such as for use in an AGV or an AGF, has been developed to address a number of issues. The homing assembly includes a unique design that not only improves accuracy and ease of use but also simplifies manufacturing and can reduce cost by reducing the tools required for installation. The homing assembly includes, but is not limited to, one or more sensors, one or more encoders, a sensor target, and at least one mounting adaptor.

The homing assembly couples to a steering unit, which generally includes a steering wheel, a steering shaft, a gearbox, and a steering column. The steering unit further couples to a steering motor. The steering motor transforms electric power into mechanical force to turn the steering unit. In one example, the homing assembly is mounted on the gearbox. During installation, the homing assembly is installed after the gearbox is installed. This reduces errors due to backlash of the gearbox.

The homing assembly may include at least two unique sensors having a narrow field of detection, which in turn increases detection precision. The sensors are coupled to the steering shaft and can be adjusted to set the steering wheel true, thus removing any potential discrepancies caused by individual adjustments of sensors.

The homing assembly in one example includes at least two encoders. Mechanically, the encoders are coupled to the steering unit. The encoders are configured to verify the steering shaft location redundantly in addition to the sensors. The sensor target is moveably coupled to the homing assembly. When the sensor target is in and/or out of a specified range of detection, the sensors change state. The mounting adaptors are configured to facilitate the installation of the homing assembly, providing an easy and precise installation.

To further promote accuracy, the homing sequence is configured to occur only in one direction, either clockwise or counterclockwise. Having the homing sequence occur in a single direction in turn reduces the risk of the homing assembly having different home positions.

The systems and techniques as described and illustrated herein concern a number of unique and inventive aspects. Some, but by no means all, of these unique aspects are summarized below.

Aspect 1 generally concerns a system.

Aspect 2 generally concerns the system of any previous aspect including a forklift.

Aspect 3 generally concerns the system of any previous aspect in which the forklift includes an automated guided forklift (AGF).

Aspect 4 generally concerns the system of any previous aspect in which the automated guided forklift is configured to operate autonomously.

Aspect 5 generally concerns the system of any previous aspect in which the automated guided forklift is configured to operate semi-autonomously.

Aspect 6 generally concerns the system of any previous aspect in which the forklift includes a steering system configured to steer the forklift.

Aspect 7 generally concerns the system of any previous aspect in which the steering system includes a motor.

Aspect 8 generally concerns the system of any previous aspect in which the motor includes an electric motor.

Aspect 9 generally concerns the system of any previous aspect in which the steering system includes a gearbox.

Aspect 10 generally concerns the system of any previous aspect in which the motor is mechanically connected to the gearbox.

Aspect 11 generally concerns the system of any previous aspect in which the steering system includes a steer unit.

Aspect 12 generally concerns the system of any previous aspect in which the steering system includes a steer arm.

Aspect 13 generally concerns the system of any previous aspect in which the steering system includes an axle.

Aspect 14 generally concerns the system of any previous aspect in which the axle is connected to the steer arm.

Aspect 15 generally concerns the system of any previous aspect in which the steering system includes one or more steer wheels.

Aspect 16 generally concerns the system of any previous aspect in which the steer wheels are configured to steer the forklift.

Aspect 17 generally concerns the system of any previous aspect in which the steer wheels are connected to the steer arm through the axle.

Aspect 18 generally concerns the system of any previous aspect in which the steer unit includes the steer arm, the axle, and the steer wheels.

Aspect 19 generally concerns the system of any previous aspect in which the motor is configured to rotate the steer arm to turn the forklift.

Aspect 20 generally concerns the system of any previous aspect in which the motor is configured to rotate the steer arm through the gearbox.

Aspect 21 generally concerns the system of any previous aspect in which the steer arm has a steering shaft.

Aspect 22 generally concerns the system of any previous aspect in which the steering shaft has teeth that are engaged to one or more gears in the gearbox.

Aspect 23 generally concerns the system of any previous aspect in which the steering shaft has a shaft end surface.

Aspect 24 generally concerns the system of any previous aspect in which the steering shaft defines one or more fastener holes.

Aspect 25 generally concerns the system of any previous aspect in which the steering system is a rear type steering system.

Aspect 26 generally concerns the system of any previous aspect in which the forklift includes a controller.

Aspect 27 generally concerns the system of any previous aspect in which the controller is operatively coupled to the motor.

Aspect 28 generally concerns the system of any previous aspect in which the controller is operatively coupled to the steering system.

Aspect 29 generally concerns the system of any previous aspect in which the controller is configured to control steering of the forklift through the steering system.

Aspect 30 generally concerns the system of any previous aspect in which the controller is configured to control steering of the forklift via the motor.

Aspect 31 generally concerns the system of any previous aspect in which the steering system includes a homing system.

Aspect 32 generally concerns the system of any previous aspect in which the homing system is operatively coupled to the controller.

Aspect 33 generally concerns the system of any previous aspect in which the homing system is secured to the gearbox.

Aspect 34 generally concerns the system of any previous aspect in which the homing system is coupled to the steer arm.

Aspect 35 generally concerns the system of any previous aspect in which the homing system is configured to determine a home position of the steering system.

Aspect 36 generally concerns the system of any previous aspect in which the homing system is configured to determine the home position by rotating the steer arm in a single direction.

Aspect 37 generally concerns the system of any previous aspect in which the single direction is a clockwise direction.

Aspect 38 generally concerns the system of any previous aspect in which the single direction is a counterclockwise direction.

Aspect 39 generally concerns the system of any previous aspect in which the homing system includes an adapter plate.

Aspect 40 generally concerns the system of any previous aspect in which the adapter plate is secured to the gearbox.

Aspect 41 generally concerns the system of any previous aspect in which the adapter plate defines an adapter opening.

Aspect 42 generally concerns the system of any previous aspect in which the adapter plate has a gasket lip surrounding the adapter opening.

Aspect 43 generally concerns the system of any previous aspect in which the homing system includes a gasket configured to reduce debris entering the steering system.

Aspect 44 generally concerns the system of any previous aspect in which the gasket is supported on the gasket lip.

Aspect 45 generally concerns the system of any previous aspect in which the homing system includes a shaft adapter.

Aspect 46 generally concerns the system of any previous aspect in which the shaft adapter is secured to the steer arm.

Aspect 47 generally concerns the system of any previous aspect in which the shaft adapter is secured to the shaft end surface of the shaft.

Aspect 48 generally concerns the system of any previous aspect in which the homing system includes an encoder shaft.

Aspect 49 generally concerns the system of any previous aspect in which the encoder shaft is coupled to the steer arm to rotate in unison with the steer arm.

Aspect 50 generally concerns the system of any previous aspect in which the encoder shaft is secured to the shaft adapter.

Aspect 51 generally concerns the system of any previous aspect in which the encoder shaft includes a flange and a shaft extending from the flange.

Aspect 52 generally concerns the system of any previous aspect in which the flange is secured to the shaft adapter.

Aspect 53 generally concerns the system of any previous aspect in which the shaft adapter defines a shaft protrusion hole.

Aspect 54 generally concerns the system of any previous aspect in which the encoder shaft has a shaft protrusion extending from the flange on a side opposite to the shaft.

Aspect 55 generally concerns the system of any previous aspect in which the shaft protrusion of the encoder shaft is received in the shaft protrusion hole of the shaft adapter.

Aspect 56 generally concerns the system of any previous aspect in which the shaft of the encoder shaft is disposed along a rotational axis of the steer arm.

Aspect 57 generally concerns the system of any previous aspect in which the homing system includes a target.

Aspect 58 generally concerns the system of any previous aspect in which the target is coupled to the steer arm.

Aspect 59 generally concerns the system of any previous aspect in which the target is configured to rotate in unison with the steer arm about the rotational axis of the steer arm.

Aspect 60 generally concerns the system of any previous aspect in which the target is configured to move in unison with the steer arm.

Aspect 61 generally concerns the system of any previous aspect in which the target is secured to the shaft adapter.

Aspect 62 generally concerns the system of any previous aspect in which the target is secured to the shaft adapter via a fastener.

Aspect 63 generally concerns the system of any previous aspect in which the target is secured to the shaft adapter via one or more pins to reduce relative movement between the target and the shaft adapter.

Aspect 64 generally concerns the system of any previous aspect in which the target is in the form of a plate.

Aspect 65 generally concerns the system of any previous aspect in which the target has an arched shape.

Aspect 66 generally concerns the system of any previous aspect in which the target has a semi-circular shape.

Aspect 67 generally concerns the system of any previous aspect in which the target has an inner radial side and an outer radial side.

Aspect 68 generally concerns the system of any previous aspect in which the target has a homing edge extending in a radial direction.

Aspect 69 generally concerns the system of any previous aspect in which the homing edge extends in the radial direction from the inner radial side to the outer radial side.

Aspect 70 generally concerns the system of any previous aspect in which the target has a trailing edge extending in a radial direction.

Aspect 71 generally concerns the system of any previous aspect in which the trailing edge extends in the radial direction from the inner radial side to the outer radial side.

Aspect 72 generally concerns the system of any previous aspect in which the homing edge and the trailing edge extend at an angle of at least ninety degrees relative to one another.

Aspect 73 generally concerns the system of any previous aspect in which the target extends across at least one rotational quadrant of the steer arm.

Aspect 74 generally concerns the system of any previous aspect in which the homing system includes a mounting plate.

Aspect 75 generally concerns the system of any previous aspect in which the mounting plate is secured to the adapter plate.

Aspect 76 generally concerns the system of any previous aspect in which the homing system includes one or more target spacers that space the mounting plate from the adapter plate.

Aspect 77 generally concerns the system of any previous aspect in which the target spacers define a gap where the target is disposed between the adapter plate and the mounting plate.

Aspect 78 generally concerns the system of any previous aspect in which the mounting plate defines a shaft opening through which the encoder shaft extends.

Aspect 79 generally concerns the system of any previous aspect in which the mounting plate defines one or more sensor holes.

Aspect 80 generally concerns the system of any previous aspect in which the sensor holes include a first sensor hole and a second sensor hole.

Aspect 81 generally concerns the system of any previous aspect in which the first sensor hole and the second sensor hole are aligned along a sensor alignment line that extends in a straight radial direction from the shaft opening.

Aspect 82 generally concerns the system of any previous aspect in which the mounting plate defines one or more adjustment slots.

Aspect 83 generally concerns the system of any previous aspect in which the adjustment slots have an oblong shape.

Aspect 84 generally concerns the system of any previous aspect in which the mounting plate defines an access cutout.

Aspect 85 generally concerns the system of any previous aspect in which the homing system includes one or more encoders.

Aspect 86 generally concerns the system of any previous aspect in which the encoders are radial encoders.

Aspect 87 generally concerns the system of any previous aspect in which the encoders are incremental type encoders.

Aspect 88 generally concerns the system of any previous aspect in which the encoders are absolute type encoders.

Aspect 89 generally concerns the system of any previous aspect in which the encoders are configured to monitor angular rotation of the steer arm.

Aspect 90 generally concerns the system of any previous aspect in which the encoder shaft extends through the encoders.

Aspect 91 generally concerns the system of any previous aspect in which the encoders are configured to monitor angular rotation of the encoder shaft.

Aspect 92 generally concerns the system of any previous aspect in which the encoders include at least two encoders.

Aspect 93 generally concerns the system of any previous aspect in which the encoders are rotary encoders.

Aspect 94 generally concerns the system of any previous aspect in which the encoders includes a first rotary encoder and a second rotary encoder.

Aspect 95 generally concerns the system of any previous aspect in which the first rotary encoder is secured to the mounting plate.

Aspect 96 generally concerns the system of any previous aspect in which the first rotary encoder surrounds the shaft opening in the mounting plate.

Aspect 97 generally concerns the system of any previous aspect in which the homing system includes an encoder plate.

Aspect 98 generally concerns the system of any previous aspect in which the encoder plate is disposed between the first rotary encoder and the second rotary encoder.

Aspect 99 generally concerns the system of any previous aspect in which the encoder plate is secured to the mounting plate.

Aspect 100 generally concerns the system of any previous aspect in which the homing system includes one or more encoder spacers spacing the encoder plate from the mounting plate.

Aspect 101 generally concerns the system of any previous aspect in which the homing system includes one or more sensors.

Aspect 102 generally concerns the system of any previous aspect in which the sensors are configured to detect the target.

Aspect 103 generally concerns the system of any previous aspect in which the sensors are proximity sensors.

Aspect 104 generally concerns the system of any previous aspect in which the sensors are inductive proximity sensors.

Aspect 105 generally concerns the system of any previous aspect in which the sensors are mounted to the mounting plate.

Aspect 106 generally concerns the system of any previous aspect in which the sensors include at least two sensors.

Aspect 107 generally concerns the system of any previous aspect in which the sensors include a first proximity sensor and a second proximity sensor.

Aspect 108 generally concerns the system of any previous aspect in which the first proximity sensor is mounted in the first sensor hole in the mounting plate.

Aspect 109 generally concerns the system of any previous aspect in which the second proximity sensor is mounted in the second sensor hole in the mounting plate.

Aspect 110 generally concerns the system of any previous aspect in which the first proximity sensor and the second proximity sensor are aligned along a sensor alignment line.

Aspect 111 generally concerns the system of any previous aspect in which the target is made of metal.

Aspect 112 generally concerns the system of any previous aspect in which the controller is configured to rotate the steer arm in a homing direction.

Aspect 113 generally concerns the system of any previous aspect in which the sensors are configured to detect the homing edge of the target when the controller rotates the steer arm in the single direction.

Aspect 114 generally concerns the system of any previous aspect in which the first proximity sensor and the second proximity sensor are configured to detect the homing edge of the target rotated in the homing direction.

Aspect 115 generally concerns the system of any previous aspect in which the homing direction is a clockwise direction.

Aspect 116 generally concerns the system of any previous aspect in which the homing direction is a counterclockwise direction.

Aspect 117 generally concerns the system of any previous aspect in which the controller is configured to determine a home position of the steering system based on detection of the target with the sensors and angular orientation information from the encoders.

Aspect 118 generally concerns the system of any previous aspect in which the adjustment slots in the mounting plate are configured to facilitate positional adjustment of the sensors.

Aspect 119 generally concerns the system of any previous aspect in which the controller is configured to determine an offset value to adjust steering operations based on the home position.

Aspect 120 generally concerns a method.

Aspect 121 generally concerns the method of any previous aspect including turning a steering system of a forklift in a homing direction.

Aspect 122 generally concerns the method of any previous aspect including detecting a target rotating with the steering system with at least two sensors.

Aspect 123 generally concerns the method of any previous aspect including monitoring an angular position of the steering system with at least two encoders.

Aspect 124 generally concerns the method of any previous aspect including setting a home position of the steering system of the forklift to the angular position from the encoders upon the detecting the target with the sensors.

Aspect 125 generally concerns the method of any previous aspect including sensing the target with the sensors.

Aspect 126 generally concerns the method of any previous aspect including rotating the steering system in a reset direction in response to sensing the target.

Aspect 127 generally concerns the method of any previous aspect in which the reset direction is opposite to the homing direction.

Aspect 128 generally concerns the method of any previous aspect including sensing a falling edge of the target moving in the reset direction with the sensors.

Aspect 129 generally concerns the method of any previous aspect including performing the turning the steering system of the forklift in the homing direction after the sensing the falling edge of the target.

Aspect 130 generally concerns the method of any previous aspect including determining an offset value based on the home position with a controller.

Aspect 131 generally concerns the method of any previous aspect including turning the steering system at an angle adjusted by the offset value with the controller.

Aspect 132 generally concerns the method of any previous aspect including adjusting the sensors to the home position by rotating a mounting plate to which the sensors are mounted.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
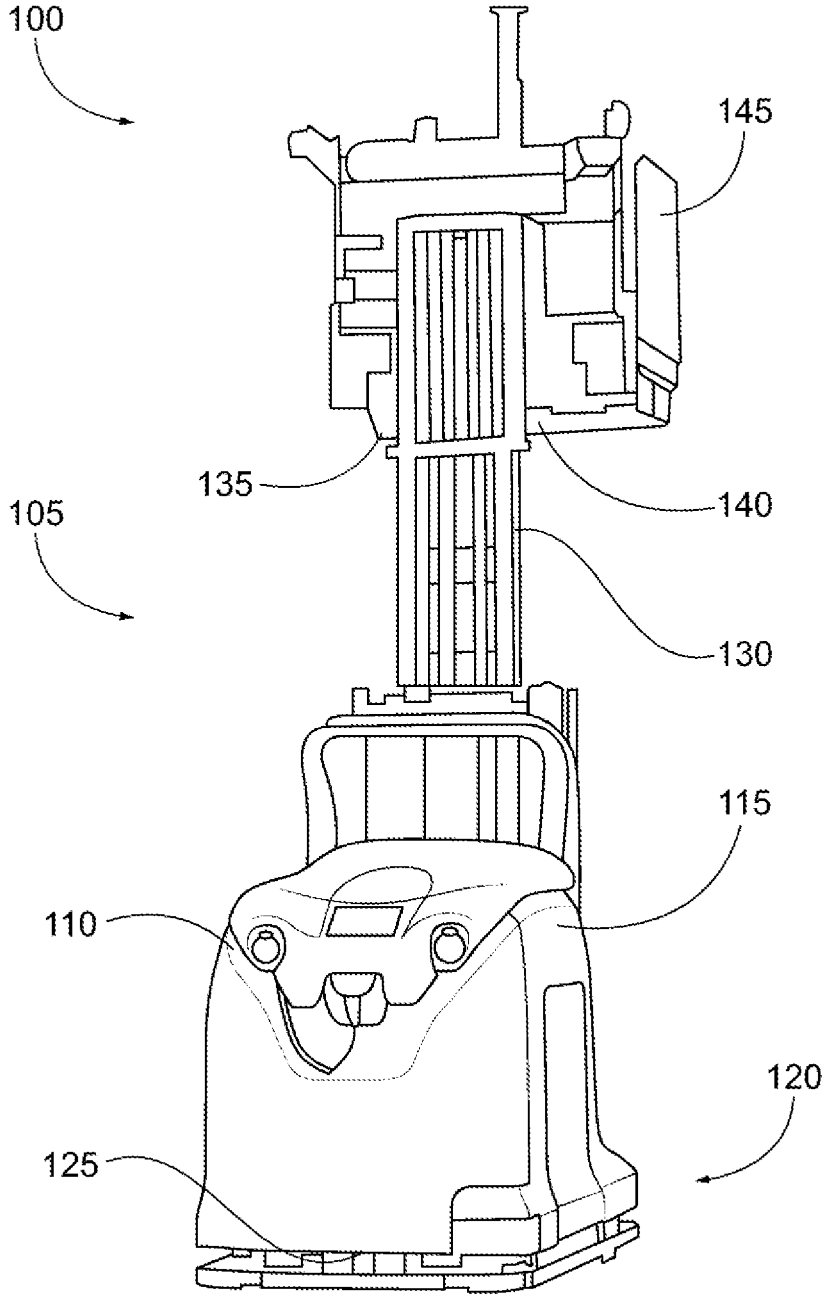
FIG. 1 is a perspective view of a system including an automated guided forklift ("AGF") according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 illustrates a system 100 that includes a forklift 105 according to one example. In the illustrated example, the forklift 105 is an automated guided forklift (AGF) 110, but the forklift 105 in other examples can include other types of forklifts and/or automated guided vehicles (AGVs). As can be seen, the forklift 105 includes a body 115 with one or more wheels 120. The wheels 120 are used to move the forklift 105. The forklift 105 further includes a steering system 125 that is used to steer the forklift 105 during various activities. The forklift 105 further includes a mast 130 with a carriage 135 that has forks 140 for raising and lowering item 145. In one form, the item 145 can include a pallet, but in other examples the item 145 can include other items or objects such as containers. In the depicted example, the forklift 105 uses rear-wheel steering to steer the forklift 105. The front wheels 120 of the forklift 105 typically do not turn. The steering system 125 in the illustrated example is a rear-wheel type steering system. By using rear-wheel steering, the forklift 105 can be turned in tight spaces. In other words, the rear-wheel steering allows the forklift 105 to achieve a tighter turning radius which is helpful in tight spaces like warehouses or other storage facilities. While the steering system 125 in the automated guided forklift 110 will be described with respect to a rear-wheel steering system, it should be recognized that aspects of the steering system 125 in the system 100 can be used in front-wheel or other types of steering systems.

Figure 2:
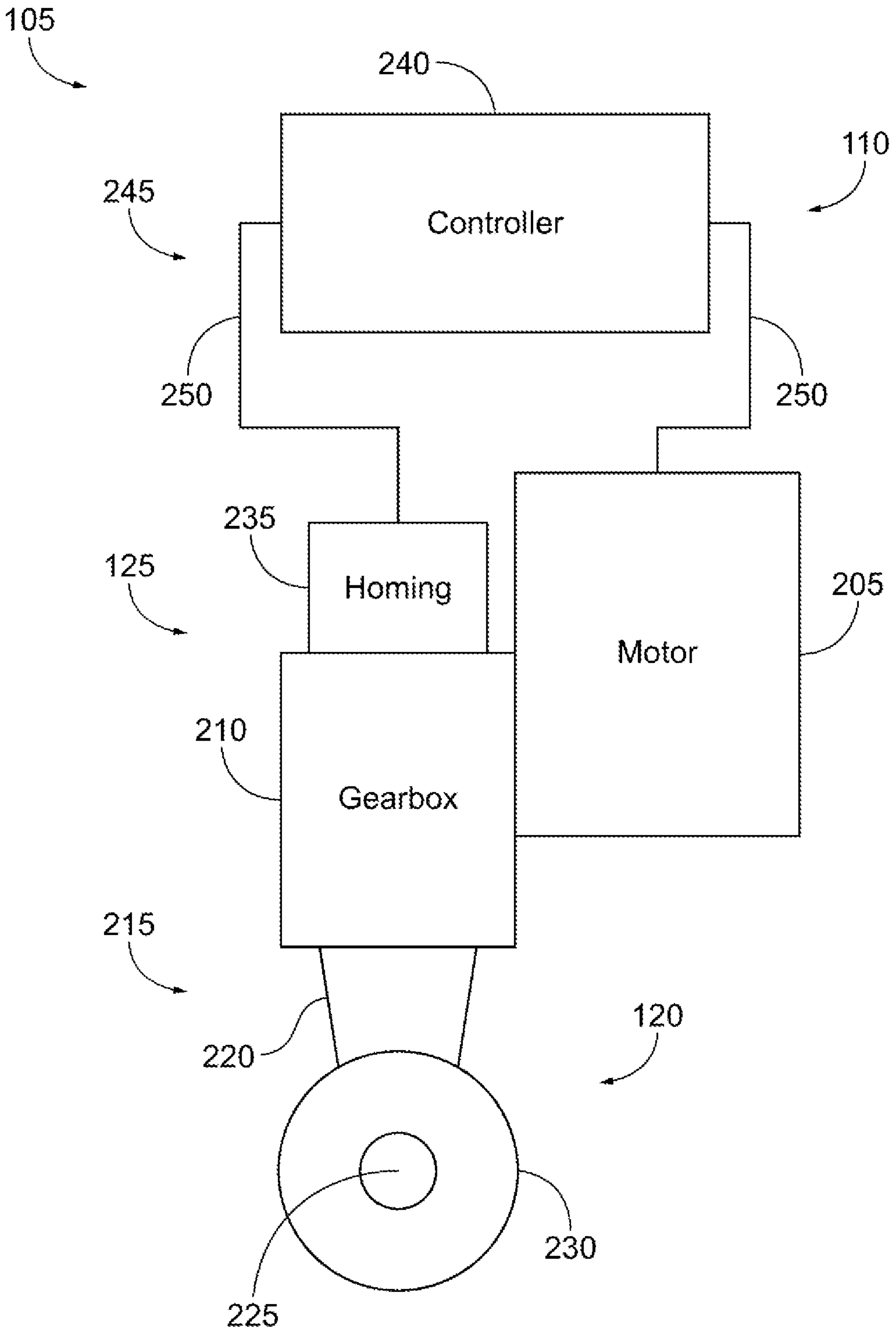
FIG. 2 is a block diagram of a steering system in the forklift of FIG. 1.

FIG. 2 shows a block diagram of the steering system 125 and other components of the forklift 105. In the illustrated example, the steering system 125 includes a motor 205, a gearbox 210, and a steer unit 215. In one form, the motor 205 is an electric motor, but in other examples, the motor 205 can include other types of motors, such as pneumatic or hydraulic type motors. The motor 205 is mechanically coupled to the gearbox 210. The gearbox 210 changes the gear ratio from the output shaft of the motor 205 so as to turn the steer unit 215. The steer unit 215 includes a steer arm 220, an axle 225, and wheels 120 in the form of one or more steer wheels 230 mounted to the axle 225. Through the gearbox 210, the steer arm 220 is mechanically coupled to the motor 205 so that the motor 205 is able to turn the steer arm 220. When the steer arm 220 is turned, the steer wheels 230 are able to steer or guide the motion of the forklift 105. With the steering system 125 arranged in such a manner, the steer wheels 230 are able to be turned for more than 90° if so desired. This in turn allows a tight turning ratio for the forklift 105.

As will be explained in greater detail below, previous steering unit designs were susceptible to errors based on the direction the steering unit was turned during a sequence used for homing or calibrating the steering unit. For example, the homing or calibration sequence for the steer unit in previous designs when performed in a counterclockwise direction (i.e., anticlockwise direction) would yield a different home position as compared to when the sequence was performed in a clockwise direction. As a result the steering angle measured from homing position would have a significant error which could cause significant problems especially for autonomous type forklifts. While human drivers of forklifts can readily compensate for these discrepancies, autonomous forklifts experience great difficulties in compensating for these steering angle errors. Prior systems required significant mechanical adjustments of any sensors used in determining the home location and/or adjustment of the steering motor which would in turn lead to more mechanical play and error in steering angle measurements. Consequently, these designs were deficient in hardware which inhibited the ability to increase safety while turning. While safety sensors were proposed to enhance the accuracy of determining the steering, these safety rated sensors still would not achieve the requisite accuracy and safety needed for automated vehicles, such as for AGFs. Moreover, the safety related sensors were quite expensive.

To address these as well as other issues, the steering system 125 further includes a homing system 235 that is connected to the steer unit 215. The homing system 235 is designed so that the homing sequence that is used to determine the home location of the steer unit 215 occurs only in one rotational direction (i.e., in the clockwise or counterclockwise direction). By calibrating in only a single direction, the accuracy in determining the steering angle of the steer wheels 230 of the steer unit 215 is enhanced which in turn enhances automatic guidance of the automated guided forklift (AGF) 110. In the illustrated example both the motor 205 and the homing system 235 are operatively coupled to a controller 240. The motor 205 and the homing system 235 in this example are operatively coupled to the controller 240 through one or more cables 245. In one form, one or more wires 250 are used to operatively couple the motor 205 and homing system 235 to the controller 240, but the motor 205 and the homing system 235 can be operatively coupled to the controller 240 in other ways, such as via a wireless connection.

Figure 3:
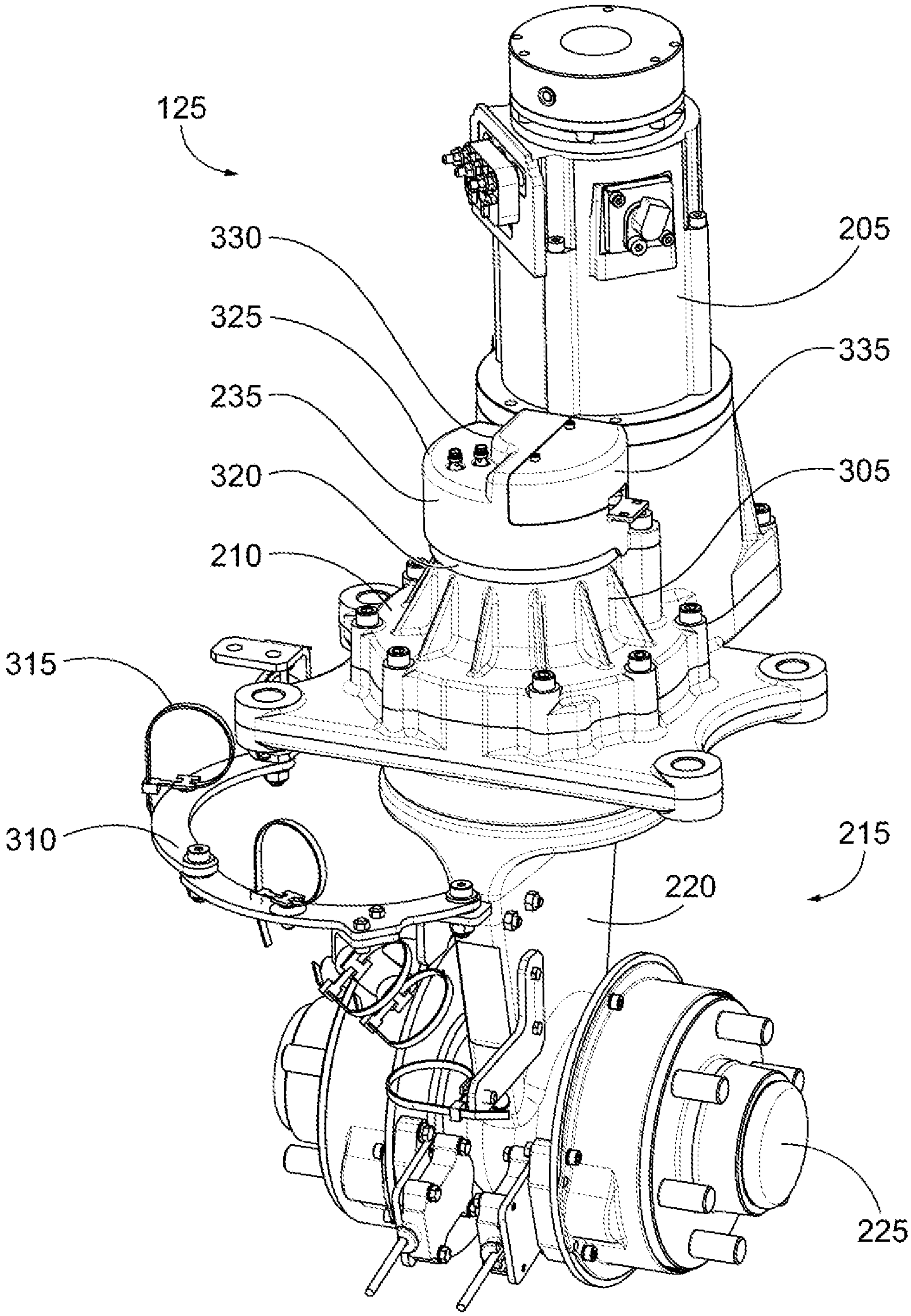
FIG. 3 is a perspective view of the FIG. 2 steering system.
Figure 4:
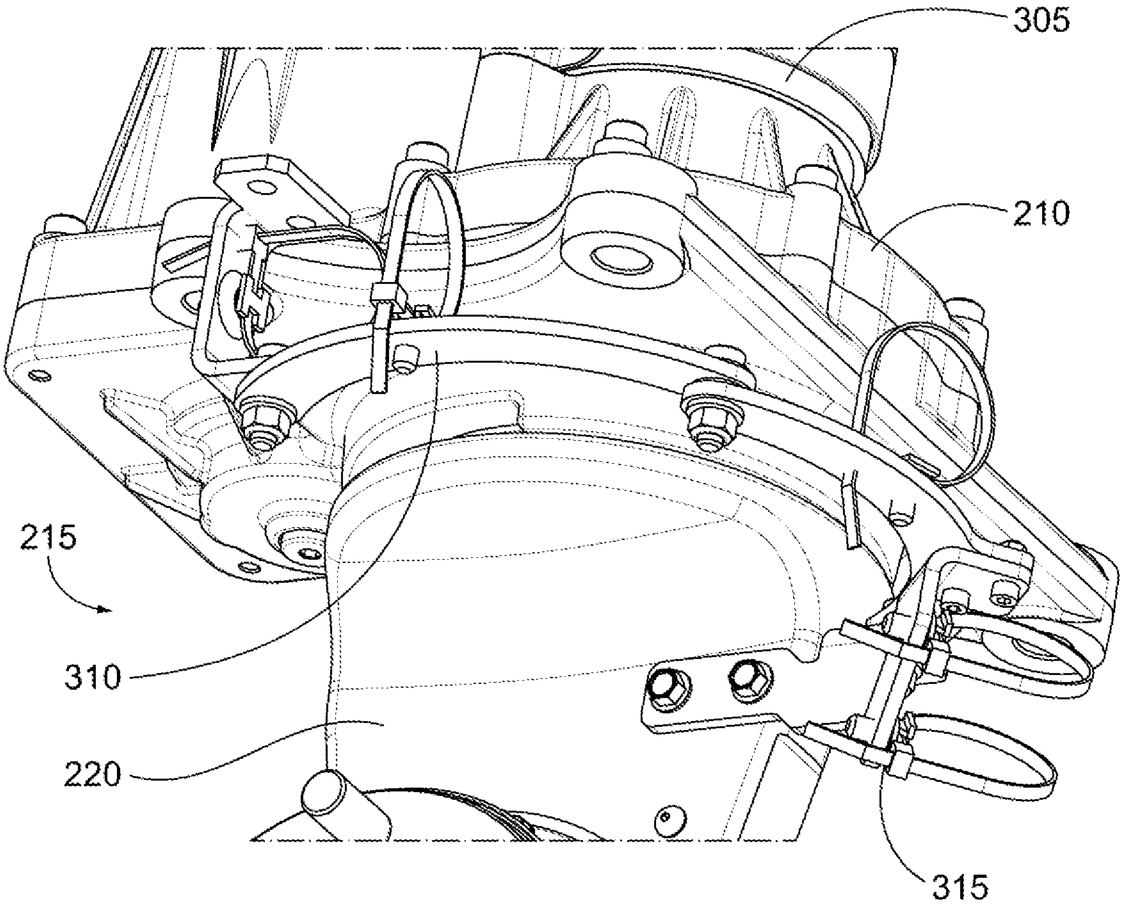
FIG. 4 is an enlarged perspective view of the FIG. 2 steering system.

Turning to FIGS. 3 and 4, the steering system 125 includes a housing 305 to which the motor 205, the steer unit 215, and the homing system 235 are mounted. Gearing forming the gearbox 210 is housed inside the housing 305. The steering system 125 further includes a cable guide 310 with one or more cable ties 315 that are used to guide cables or wiring, such as the cables 245 and wires 250 for the controller 240.

The homing system 235 includes an adapter plate 320 that is configured to secure the homing system 235 to the gearbox 210. The homing system 235 further includes an enclosure 325 that encloses various components of the homing system 235. In the illustrated example, the enclosure 325 includes a cover 330 and a lid 335 that is secured to the cover 330. The lid 335 is designed to provide access to the interior within the cover 330.

Figure 5:
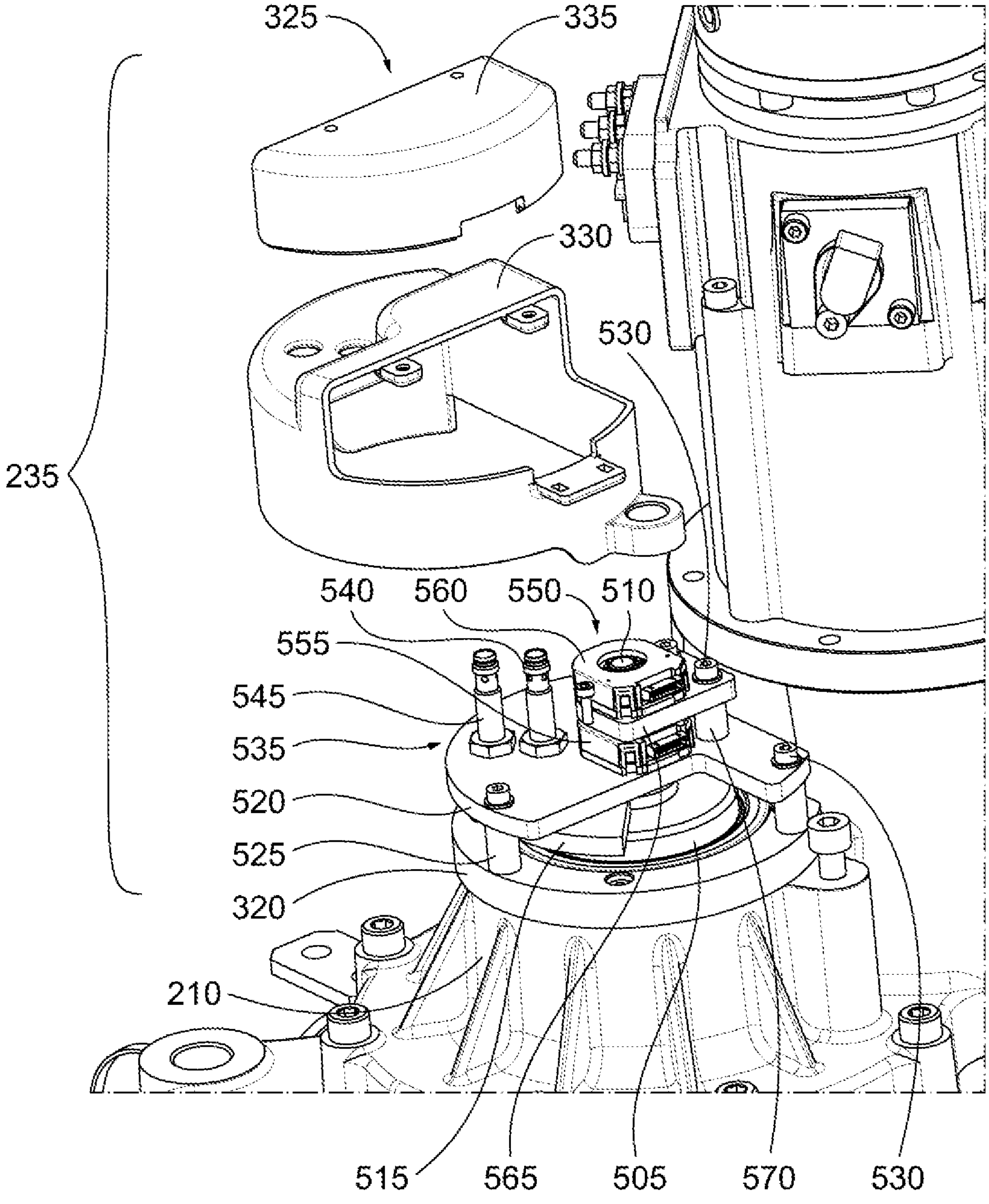
FIG. 5 is an exploded view of an enclosure in a homing system that is used in the FIG. 2 steering system.
Figure 6:
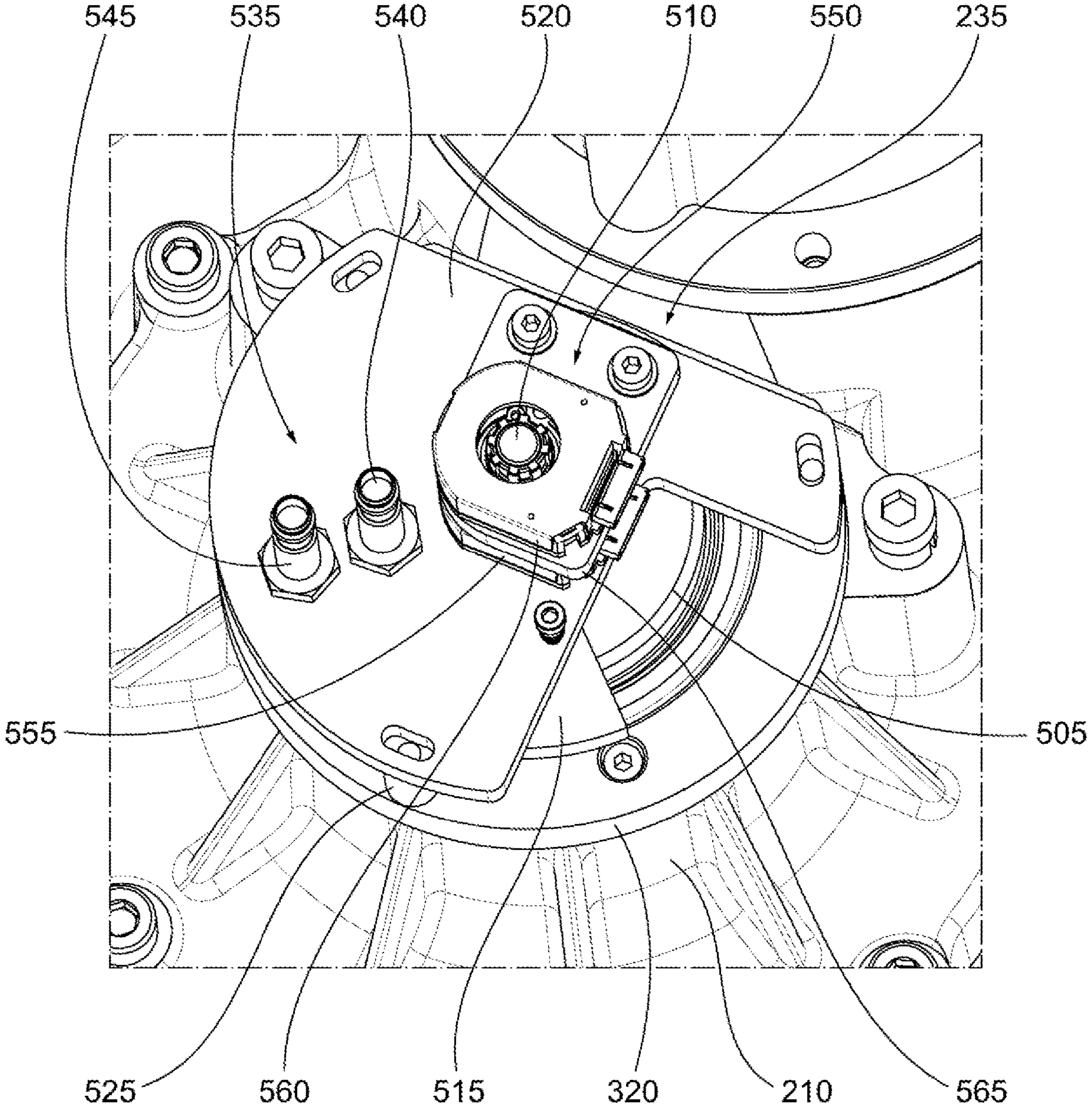
FIG. 6 is a top perspective view of the homing system of FIG. 5.
Figure 7:
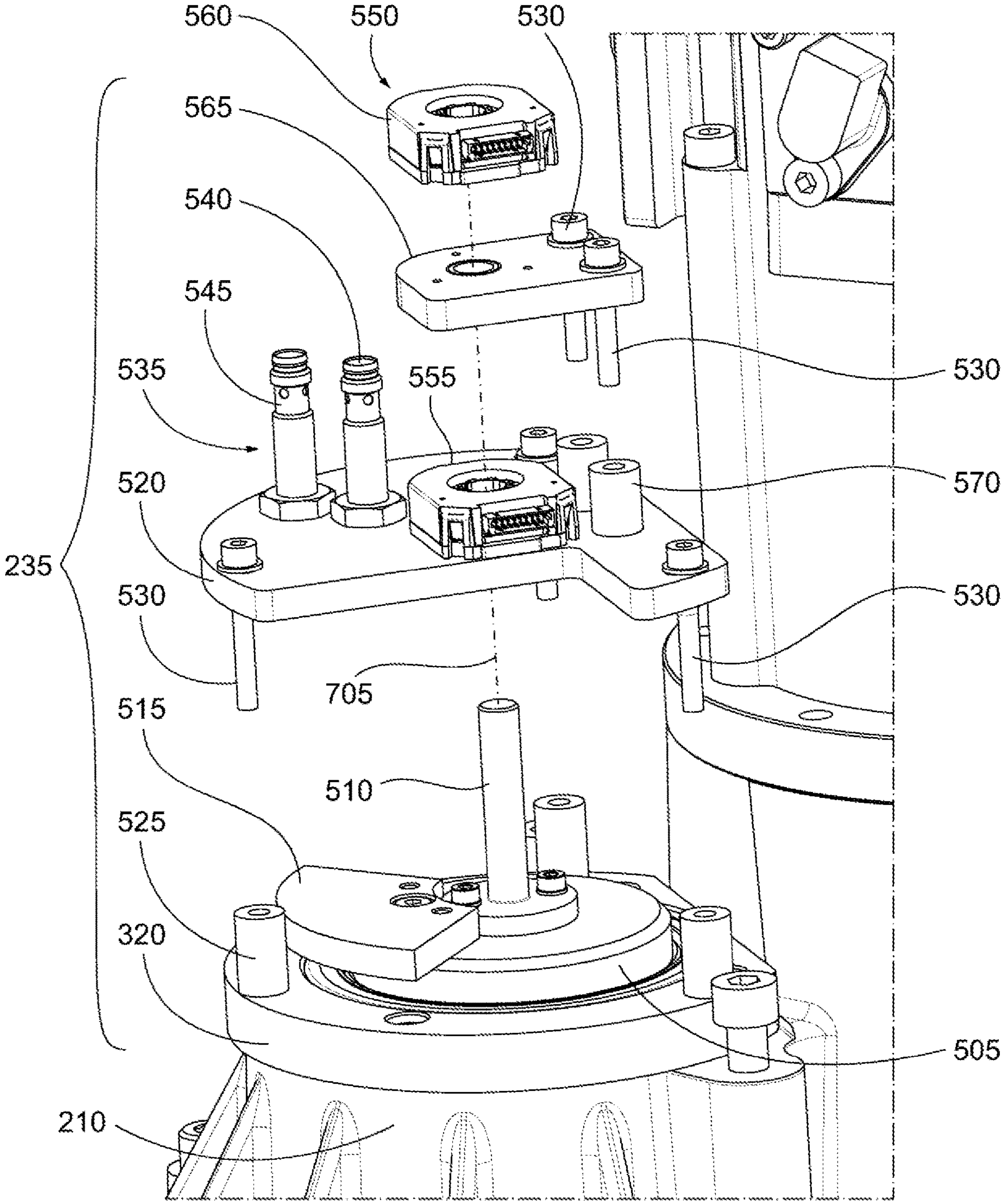
FIG. 7 is a side perspective view of the homing system of FIG. 5.

Referring to FIGS. 5, 6, and 7, the homing system 235 is configured to help determine the relative homing position of the steering system 125. The homing position is the angular or relative location where the steer wheels 230 on the steer arm 220 steer the forklift 105 in a generally straight or longitudinal direction. In other words, the homing location is where the automated guided forklift 110 is able to move forward and backwards in a relatively straight line, rather than moving in a turning direction. If the homing position is not accurately determined, the steering system 125 will tend to cause the forklift 105 to steer or move in the wrong direction. To address this issue, the homing system 235 is configured to determine the relative rotational or angular location of the steer arm 220 of the steering system 125 so that the homing position can be determined. The homing system 235 includes a shaft adapter 505 that is secured to the steer arm 220. The homing system 235 further includes an encoder shaft 510 that is secured to and extends from the shaft adapter 505. To ascertain the relative angular orientation of the steer arm 220 along with the steer wheels 230, the homing system 235 has a target 515 that is secured to the shaft adapter 505. The target 515 in the depicted example is in the form of a plate, but the target 515 can be shaped differently in other examples.

As can be seen, the homing system 235 has a mounting plate 520 that is spaced away from the adapter plate 320 via one or more target spacers 525. The mounting plate 520 is secured to the adapter plate 320 via one or more fasteners 530 that extend through the target spacers 525. The mounting plate 520 is configured to secure and orient one or more target sensors 535. It should be recognized that the mounting plate 520 can be secured to the adapter plate 320 in other manners, such as via welding and/or adhesives. The target spacers 525 space the mounting plate 520 from the adapter plate 320 so that there is enough room for the target 515 to rotate relative to the mounting plate 520 as the steer arm 220 of the steering system 125 is turned by the motor 205.

The target sensors 535 are configured to detect the target 515 so as to determine the angular orientation of the steering system 125. In this example, the target sensors 535 are in the form of inductive proximity sensors. Specifically, the target sensors 535 include a first proximity sensor 540 and a second proximity sensor 545 that are threadedly secured to the mounting plate 520. As mentioned before, the homing system 235 includes at least two of the target sensors 535. It was discovered during development of the system 100 that inductive as well as other types of proximity sensors had uneven fields which in turn caused an error between the relative orientation in which the target 515 was rotated. In this example, the homing system 235 includes at least two target sensors 535 so as to provide redundancy as well as position accuracy of the target 515. As will be explained further below, the holding position of the steering system 125 is determined by rotating the target 515 in only a single direction (i.e., clockwise direction or a counterclockwise direction). By calibrating in only a single rotational direction, the error associated with the variance in the spatial dimensions of the electromagnetic fields from the target sensors 535 is reduced.

Using this single direction calibration approach, the first proximity sensor 540 and encoders 550 do not add errors into the location determination of the steer wheels 230. Moreover, this design is robust and provides simplified manufacturing. Minimal adjustments are required for the target sensors 535 because the target sensors 535 are mounted to the rotationally adjustable mounting plate 520. This approach is even more cost effective as compared to other designs because safety rated proximity sensors are not required. As alluded to before, safety rated proximity sensors are typically 10 times more expensive than the cost of the two target spacers 525 used in this design which are not necessarily safety rated though they can be in certain circumstances. By incorporating redundancy of using at least two target sensors 535, the automated guided forklift 110 is category 3 safe, or CAT3 safe.

Surrounding the encoder shaft 510, the homing system 235 further has one or more encoders 550. In one example, the encoders 550 are radial encoders. In one form, the encoders 550 are incremental type encoders, but in other forms, the encoders 550 can include absolute type encoders. The encoders 550 are designed to detect rotation of the encoder shaft 510 which in turn corresponds to the rotation of the steer arm 220 caused by the motor 205. To provide redundancy, the encoders 550 in the illustrated example include at least two encoders 550. In particular, the homing system 235 has a first rotary encoder 555 and a second rotary encoder 560 that are mounted around the encoder shaft 510. To reduce interference between the encoders 550 the first rotary encoder 555 and the second rotary encoder 560 are spaced away from one another via an encoder plate 565. As can be seen, the encoder plate 565 is spaced from the mounting plate 520 via one or more encoder spacers 570. The encoder plate 565 at the encoder spacers 570 is secured to the mounting plate 520 via one or more of the fasteners 530. The fasteners 530 extend through the encoder spacers 570 and are threadedly secured to the mounting plate 520. It should be recognized that the encoder plate 565 in other examples can be secured in other manners, such as via welding and/or adhesives. In other words the first rotary encoder 555 is sandwiched between the mounting plate 520 and the encoder plate 565. The first rotary encoder 555 is secured to the mounting plate 520, and the second rotary encoder 560 is secured to the encoder plate 565, such as via fasteners. Via the mounting plate 520 the encoders 550 are able to monitor the rotation or steering direction of the steering system 125. The homing system 235 can be incorporated into original equipment manufacturing (OEM) forklifts 105 or installed as an aftermarket product on forklifts 105.

Referring back to FIG. 2, the target sensors 535 and the encoders 550 in FIGS. 5, 6, and 7 are operatively coupled to the controller 240 via the cables 245 and the wires 250. The controller 240 is able to monitor the relative angular orientation of the steer wheels 230 via the target sensors 535 and the encoders 550 in the homing system 235. To turn the steer wheels 230, the controller 240 of the automated guided forklift 110 activates the motor 205 which in turn turns the steer arm 220 via the gearbox 210. The controller 240 of the automated guided forklift 110 monitors the steering or turning of the steer wheels 230 via the homing system 235. The homing system 235 provides feedback control for the controller 240 of the automated guided forklift 110. As shown in FIG. 7, the encoder shaft 510 is aligned or extends along a rotational axis 705 of the steer arm 220. As the steer arm 220 rotates about the rotational axis 705, the encoder shaft 510 rotates in unison about the rotational axis 705 of the steer arm 220. This configuration allows the encoders 550 to accurately monitor the turn angle of the steer arm 220.

Figure 8:
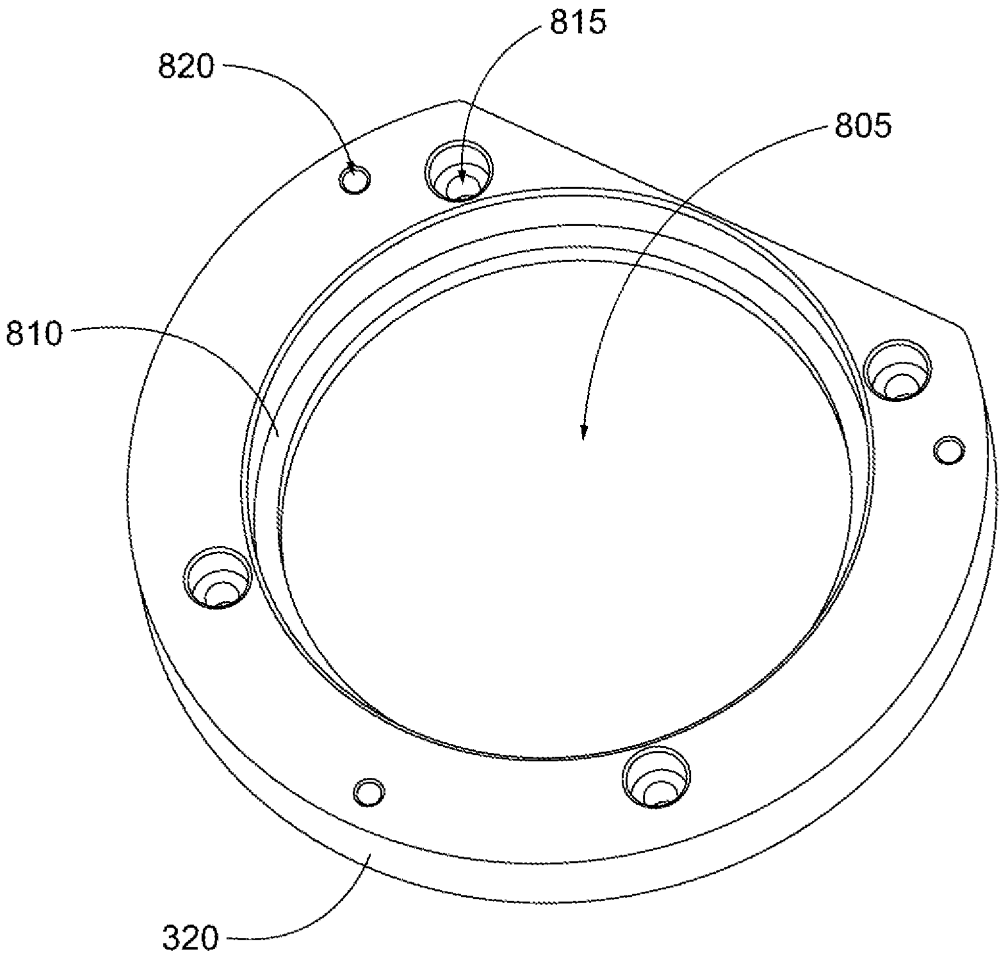
FIG. 8 is a top perspective view of an adapter plate used in the homing system of FIG. 5.

The adapter plate 320 is designed to secure the homing system 235 to the gearbox 210. FIG. 8 shows a perspective view of the adapter plate 320. As can be seen, the adapter plate 320 defines an adapter opening 805 in which the shaft adapter 505 is received. Surrounding the adapter opening 805, the adapter plate 320 has a gasket lip 810 configured to retain a gasket that surrounds the shaft adapter 505. The adapter plate 320 further includes one or more housing fastener holes 815 in which fasteners that are used to secure the adapter plate 320 to the gearbox 210 are received. As can be seen, the housing fastener holes 815 include countersinks so as to receive the head of the fasteners so as to provide a flush type or smooth surface. The adapter plate 320 further includes one or more spacer fastener holes 820 in which the fasteners 530 for the target spacers 525 are received. In one example the spacer fastener holes 820 are threaded so as to secure the fasteners 530, such as bolts.

Figure 9:
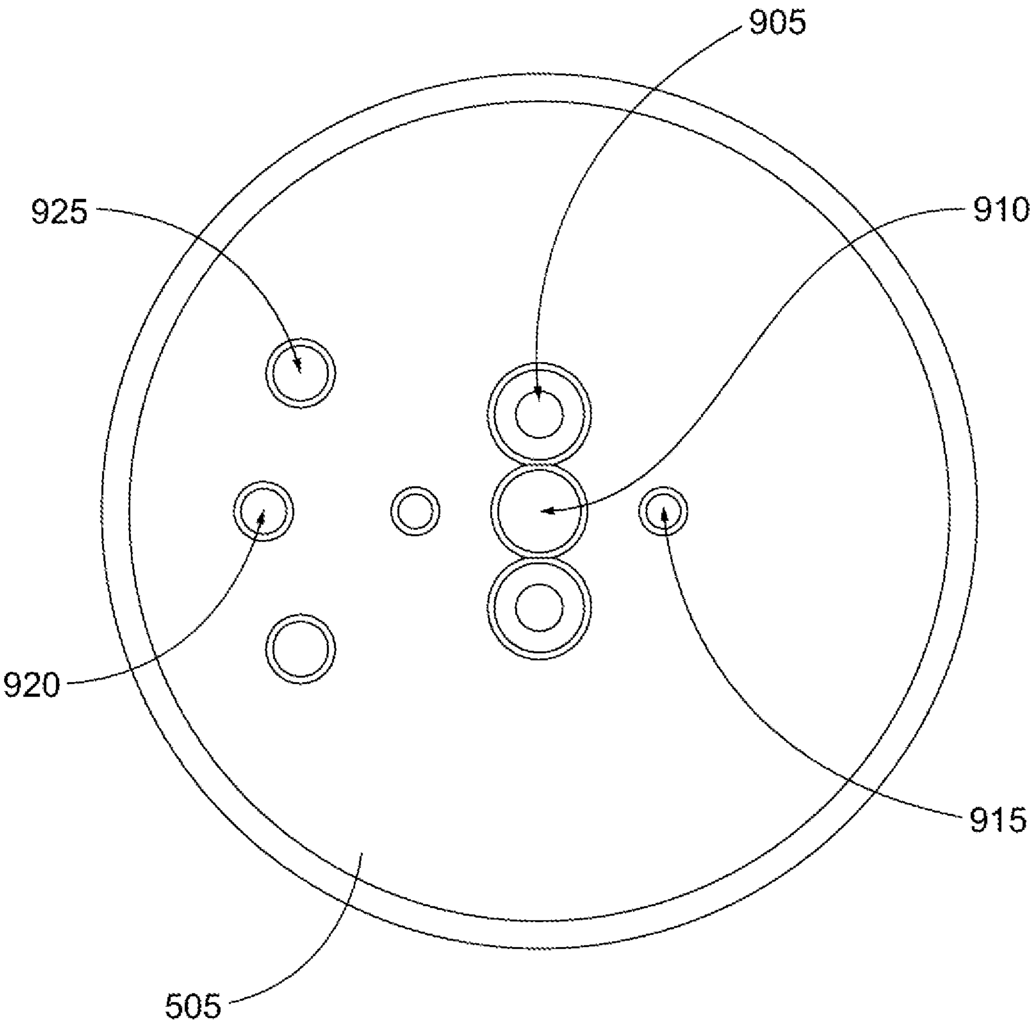
FIG. 9 is a top view of a shaft adapter used in the homing system of FIG. 5.

FIG. 9 shows a top view of the shaft adapter 505. As can be seen, the shaft adapter 505 has a generally circular or cylindrical shape. The shaft adapter 505 defines one or more steer arm fastener holes 905 that are configured to receive fasteners for securing the shaft adapter 505 to the steer arm 220. In the illustrated example, the steer arm fastener holes 905 include counterbores to receive the heads of the fasteners so as to give the shaft adapter 505 a generally smooth surface for securing the encoder shaft 510 to the shaft adapter 505. The shaft adapter 505 further defines a shaft protrusion hole 910 in which a protrusion of the shaft of the encoder shaft 510 is received and one or more shaft fastener holes 915 in which fasteners for securing the encoder shaft 510 to the shaft adapter 505 are fastened. In one example, the shaft fastener holes 915 are threaded so as to secure bolts or other types of fasteners. At an outer radial location relative to the shaft protrusion hole 910, the shaft adapter 505 defines a target fastener hole 920 in which a fastener for securing the target 515 is secured. The shaft adapter 505 further defines one or more pin holes 925 that are reconfigured to receive pins for aligning the target 515 relative to the shaft adapter 505. In the depicted example, the shaft adapter 505 includes at least two pin holes 925 that are located on opposite sides of the target fastener hole 920.

Figure 10:
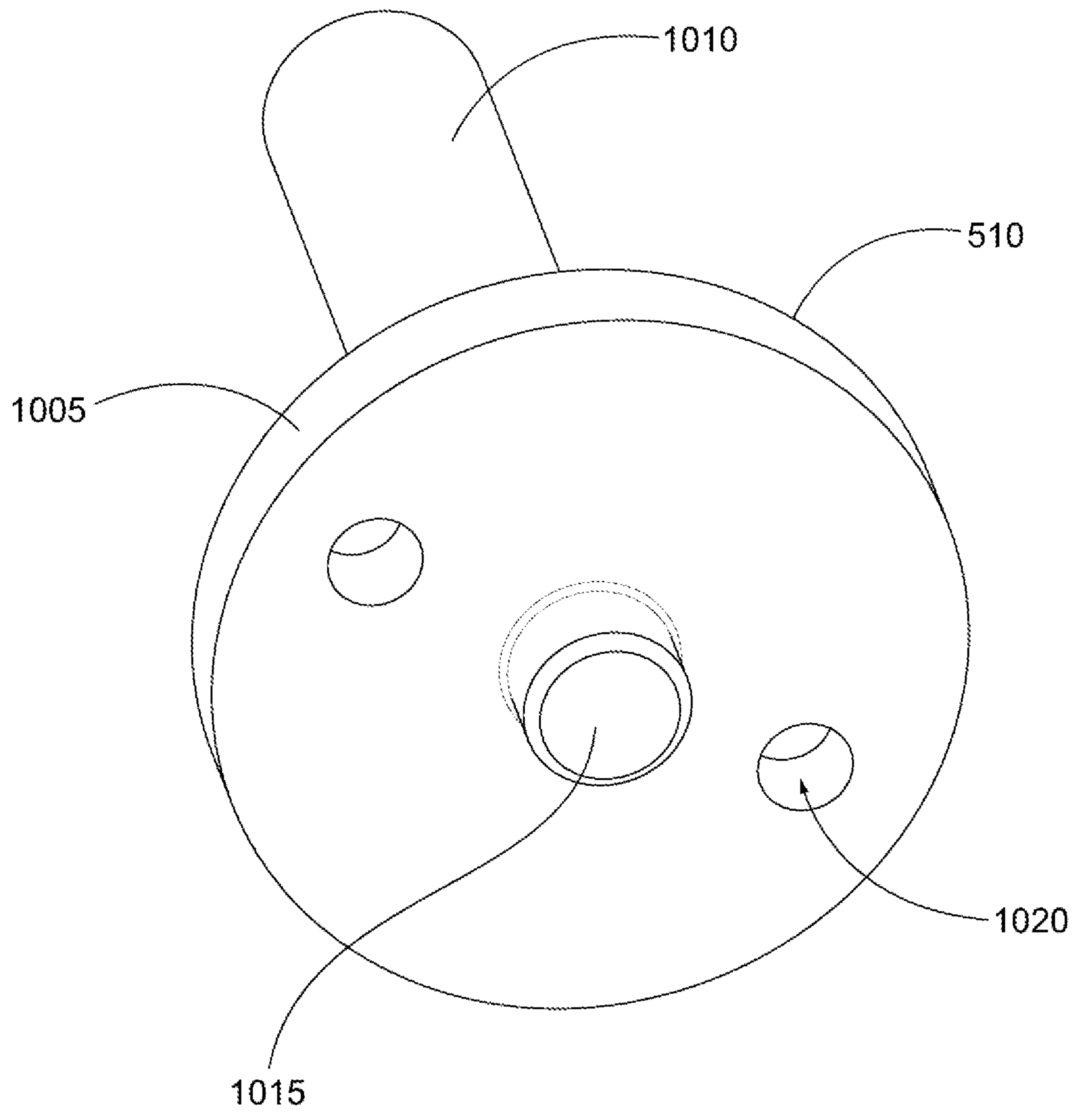
FIG. 10 is a bottom perspective view of an encoder shaft used in the homing system of FIG. 5.

FIG. 10 shows a bottom perspective view of the encoder shaft 510. As can be seen, the encoder shaft 510 includes a flange 1005 along with a shaft 1010 and a shaft protrusion 1015 extending on opposite sides of the flange 1005. The flange 1005 defines one or more flange fastener holes 1020 through which fasteners for securing the encoder shaft 510 to the shaft adapter 505 are received. The shaft 1010 and the shaft protrusion 1015 extend generally transverse or perpendicular to the flange 1005. The shaft protrusion 1015 is received in the shaft protrusion hole 910 so as to help align and stabilize the encoder shaft 510.

Figure 11:
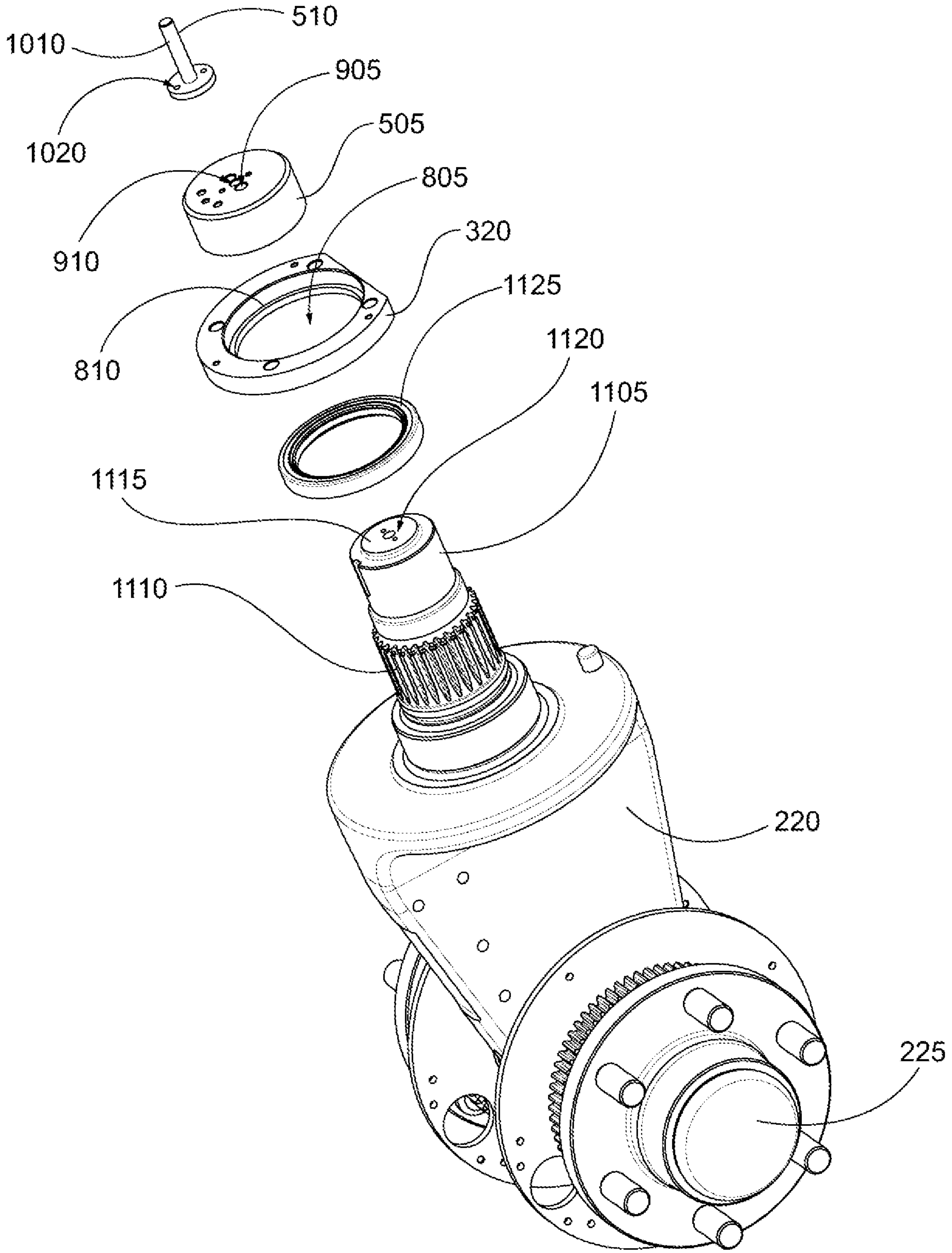
FIG. 11 is an exploded view of part of the steering system used in the forklift of FIG. 1.

FIG. 11 shows an exploded view of how the shaft adapter 505 and encoder shaft 510 are secured or otherwise integrated with the steer arm 220. As shown, the steer arm 220 includes a steering shaft 1105 extending generally transverse to the axle 225. The steering shaft 1105 includes teeth 1110 for engaging the gearing of the gearbox 210. Once more, the motor 205 via the gearbox 210 is able to rotate or turn the steer arm 220 via the teeth 1110. Opposite the axle 225, the steering shaft 1105 has a shaft end surface 1115 to which the shaft adapter 505 is secured. As can be seen, the shaft end surface 1115 of the steering shaft 1105 defines one or more fastener holes 1120 that are configured to receive fasteners that extend through the steer arm fastener holes 905 of the shaft adapter 505 so as to secure the shaft adapter 505 to the steering shaft 1105 of the steer arm 220. In one form the fastener holes 1120 are threaded so as to secure bolts, but it should be recognized that the shaft adapter 505 can be secured to the steering shaft 1105 of the steer arm 220 in other manners. To prevent debris, dirt, or other contaminants from entering the steering system 125, the homing system 235 further includes a gasket 1125 that is received in the adapter opening 805 of the adapter plate 320. The gasket 1125 rests on the gasket lip 810 that surrounds the adapter opening 805.

Figure 12:
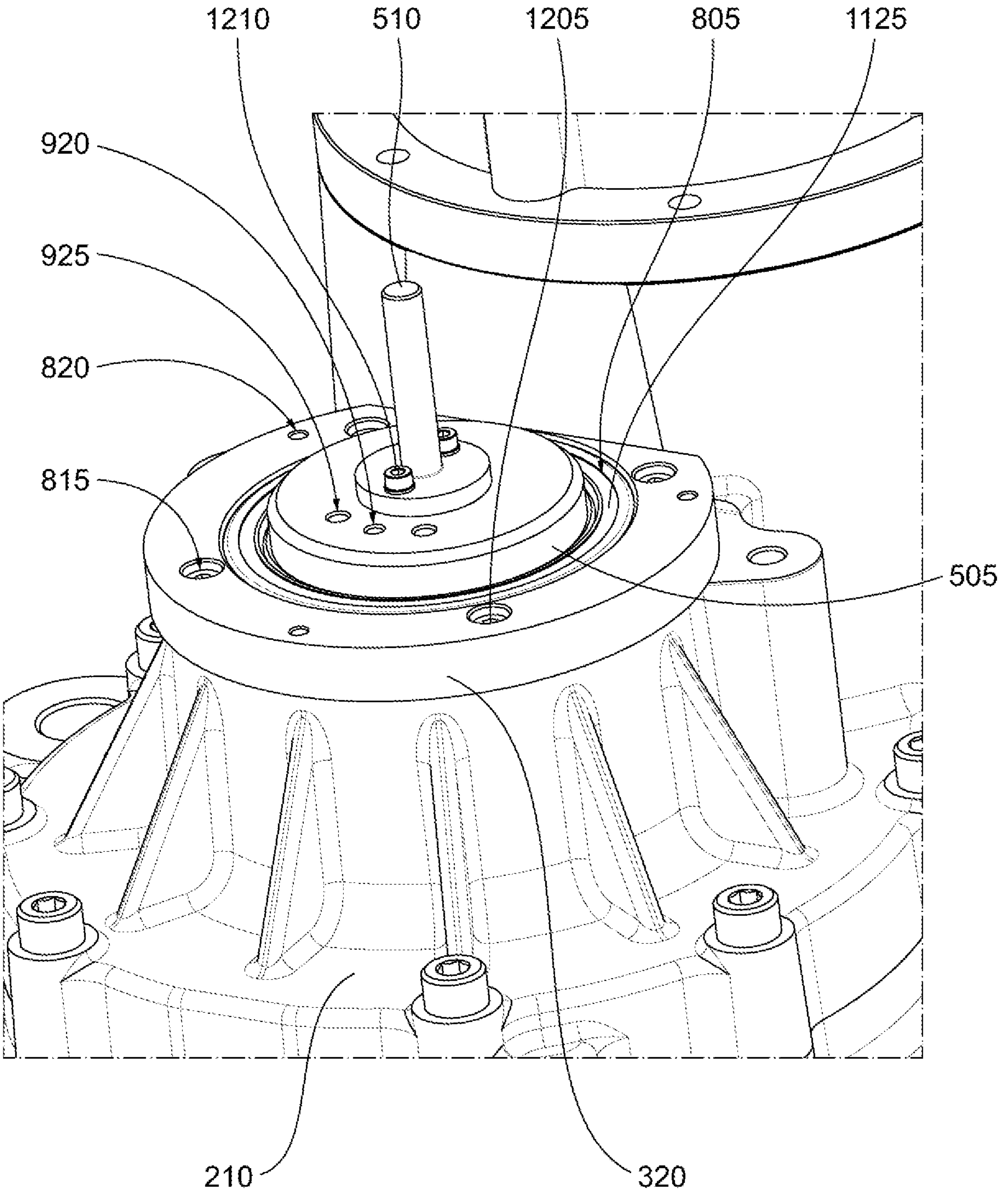
FIG. 12 is a perspective view of the FIG. 8 adapter plate, the FIG. 9 shaft adapter, and the FIG. 10 encoder shaft mounted in the FIG. 2 steering system.

Looking at FIG. 12, one or more housing fasteners 1205 are received in the housing fastener holes 815 so as to secure the adapter plate 320 to the gearbox 210. Once more, the adapter plate 320 can be secured to the gearbox 210 in other manners, such as via welding or through the use of adhesives. The encoder shaft 510 is secured to the shaft adapter 505 via one or more encoder shaft fasteners 1210 that extend through the flange fastener holes 1020 in the encoder shaft 510 and into the shaft fastener holes 915 of the shaft adapter 505. Likewise, the encoder shaft 510 can be secured to the shaft adapter 505 in other manners. Int still yet other variations, the shaft adapter 505 and the encoder shaft 510 are integrated together to form a single unitary construction.

Figure 13:
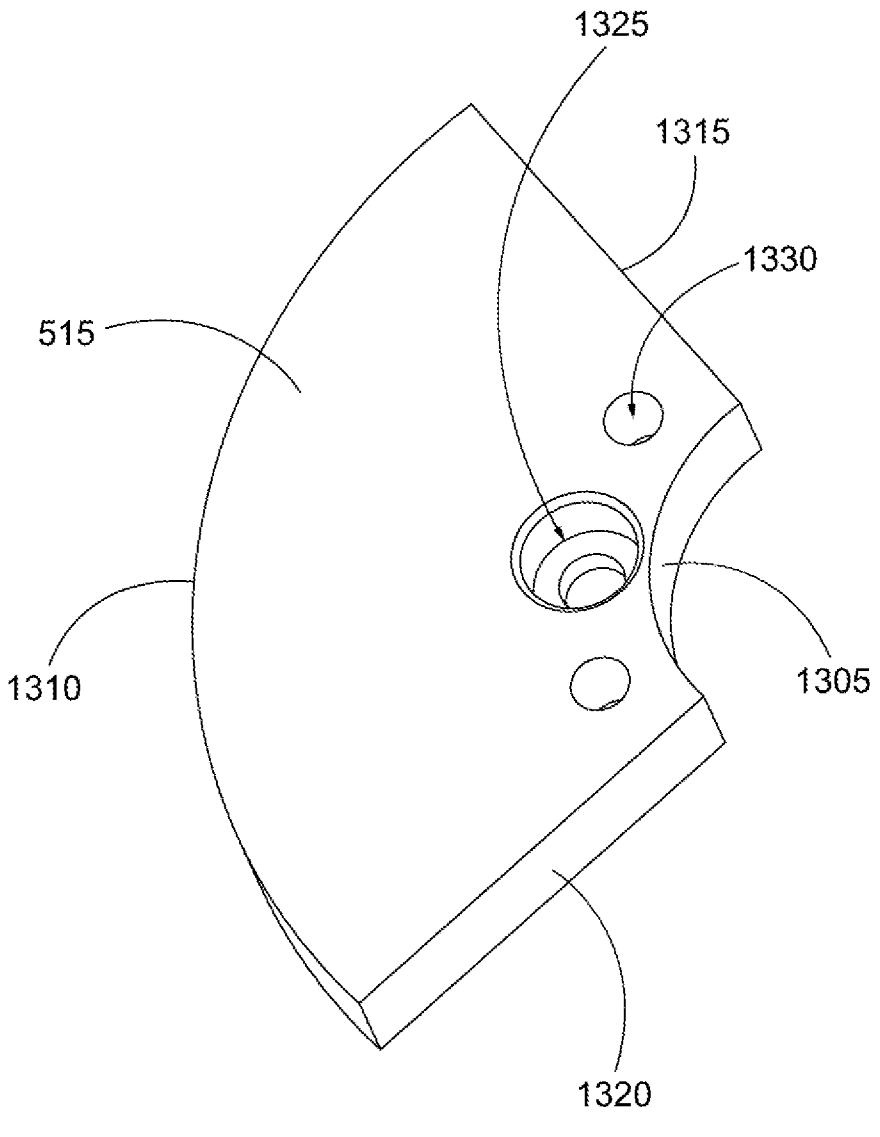
FIG. 13 is a perspective view of a target used in the homing system of FIG. 5.

Turning to FIG. 13, the target 515 includes an inner radial side 1305 located proximal to the flange 1005 of the encoder shaft 510 and an outer radial side 1310 located at a radially outwards direction relative to the inner radial side 1305. The target 515 has an overall arched shape. The inner radial side 1305 has a curved or semicircular shape to fit around the flange 1005 of the encoder shaft 510, and the outer radial side 1310 also has an arched or semicircular shape. The target 515 is made of material that is readily sensed by the target sensors 535. When the target sensors 535 are in the form of inductive proximity sensors, the target 515 is made of a metallic material, either typically ferrous metals, or sometimes, nonferrous type metallic materials. When the target sensors 535 use different properties other than induction, the target 515 can be made from other materials that would be appropriate for the detection technique being used by the target sensors 535.

Extending in a radially outward direction from the inner radial side 1305 to the encoder shaft 510, the target 515 has a homing edge 1315 and a trailing edge 1320 located on opposite sides relative to one another. In the depicted example, the homing edge 1315 and the trailing edge 1320 extend in a generally straight radial manner from the inner radial side 1305 to the outer radial side 1310. In other examples, the homing edge 1315 and the trailing edge 1320 can be shaped differently. As will be explained below, the target sensors 535 are configured to detect the homing location of the steering system 125 by detecting the homing edge 1315 when the target 515 is rotated in a single direction, such as a clockwise direction. When the homing edge 1315 extends in a radially straight manner, the first proximity sensor 540 and the second proximity sensor 545 similarly extend in a radially straight manner so that both target sensors 535 cents the homing edge 1315 at the same time. In other examples, the homing edge 1315 can be shaped differently and the target sensors 535 positioned at different locations to coincide with the shape of the homing edge 1315 so that the target sensors 535 detect the homing edge 1315 at the same time. Depending on which direction the target 515 is rotated using the single-direction homing technique, the trailing edge 1320 can be sensed by the target sensors 535 to determine the homing position.

The target 515 further defines an adapter fastener hole 1325 which is configured to receive a fastener that secures the target 515 to the shaft adapter 505. In one example, the adapter fastener hole 1325 includes a counter sink to receive a head of the fastener so that the head of the fastener is recessed or flush with the outer surface of the target 515. The target 515 further includes one or more pin holes 1330 that are configured to receive pins for aligning the target 515 with the shaft adapter 505 so as to minimize relative movement between the target 515 and the shaft adapter 505. In the depicted example, the target 515 includes two pin holes 1330 located on opposite sides of the adapter fastener hole 1325, but the pin holes 1330 can be arranged in other manners in other examples.

Figure 14:
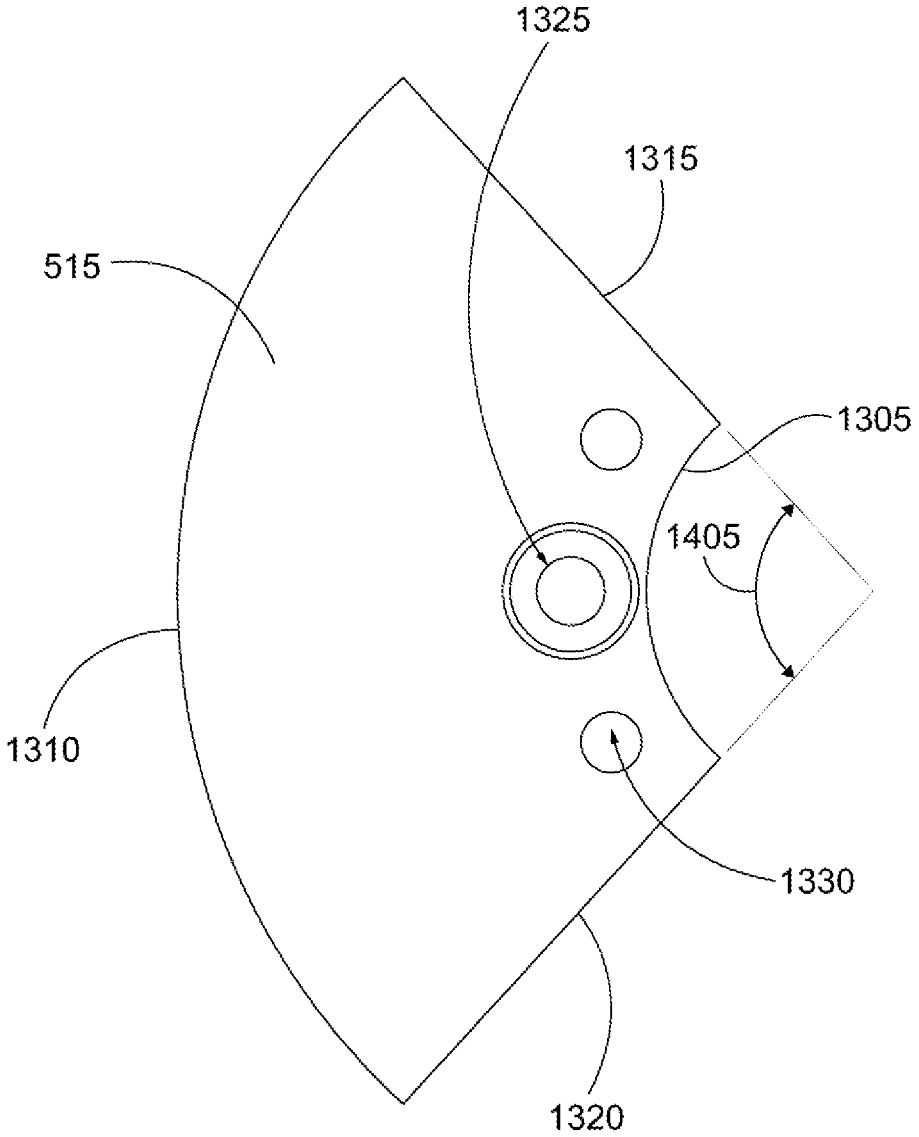
FIG. 14 is a top view of the target of FIG. 13.

To facilitate single direction detection of the target 515, the target 515 is sized large enough so that the controller 240 via the target sensors 535 is only generally able to sense the homing edge 1315. Looking at FIG. 14, the target 515 extends to cover almost or larger than a full quadrant of the turning angle of the steering system 125. In the illustrated example the homing edge 1315 and the trailing edge 1320 define an angle 1405. In one example, the angle 1405 between the homing edge 1315 and trailing edge 1320 is at least a ninety-degree (90°) angle. Depending on the overall shape of the target 515, this angle 1405 can be different. Moreover, this angle 1405 can depend on how far the steering system 125 is able to turn. For example, if the turning angle of the steering system 125 is very limited, the angle 1405 can be smaller. Conversely, if the steering system 125 is able to turn to a large degree, the target 515 will be larger so as to extend circumferentially farther.

Figure 15:
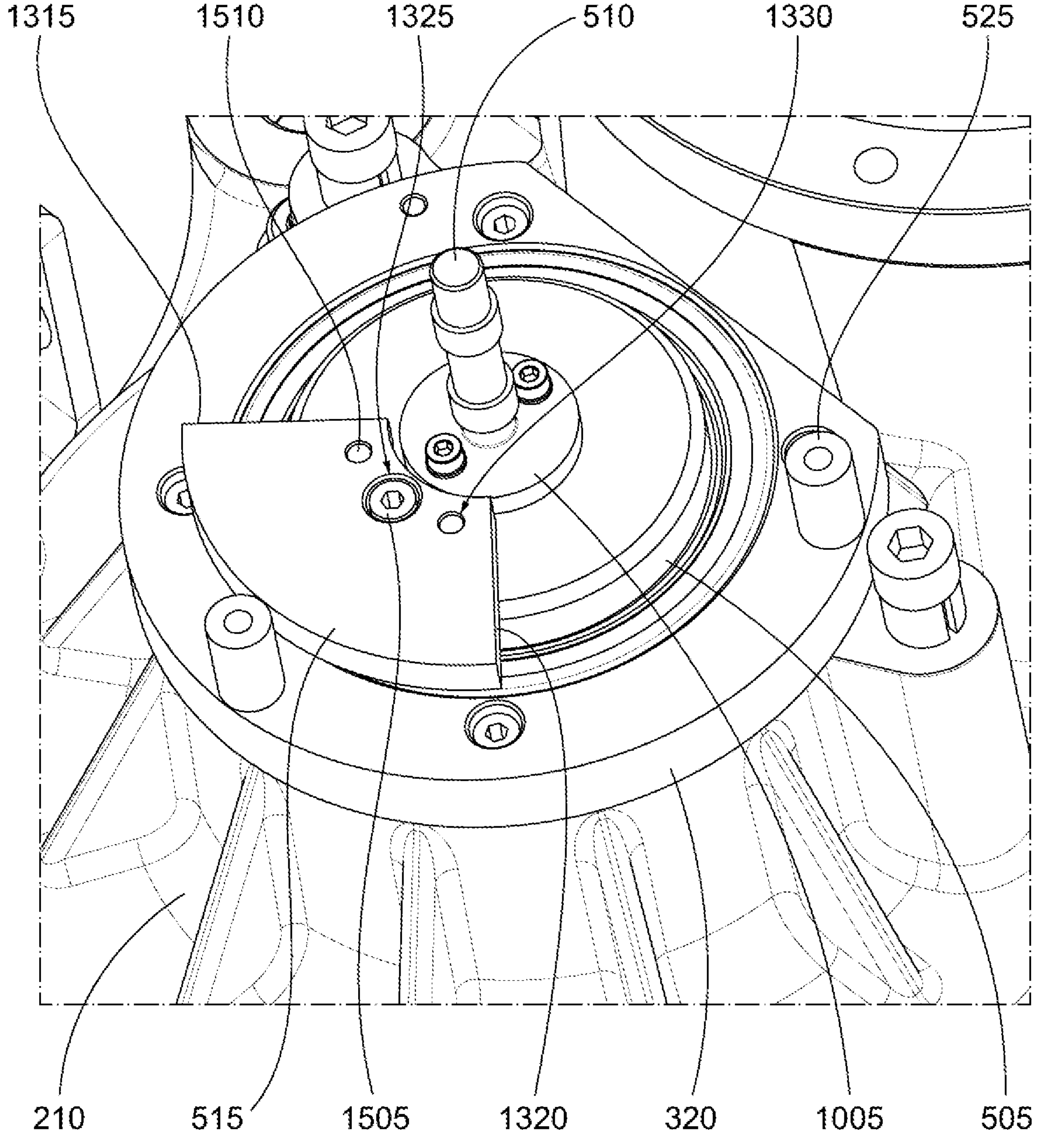
FIG. 15 is a perspective view of the FIG. 13 target mounted in the homing system of FIG. 5.

Looking at FIG. 15, a target fastener 1505 is received in the adapter fastener hole 1325 so as to secure the target 515 to the shaft adapter 505. The adapter fastener hole 1325 in one example is in the form of a bolt that is threadedly secured to target fastener hole 920 in the shaft adapter 505. One or more pins 1510 are received in the corresponding pin holes 1330 of the target 515 and the pin holes 925 of the shaft adapter 505 so as to promote alignment between the target 515 and the shaft adapter 505. It should be recognized that the shaft adapter 505 and target 515 can be secured together in other manners in further variations.

Figure 16:
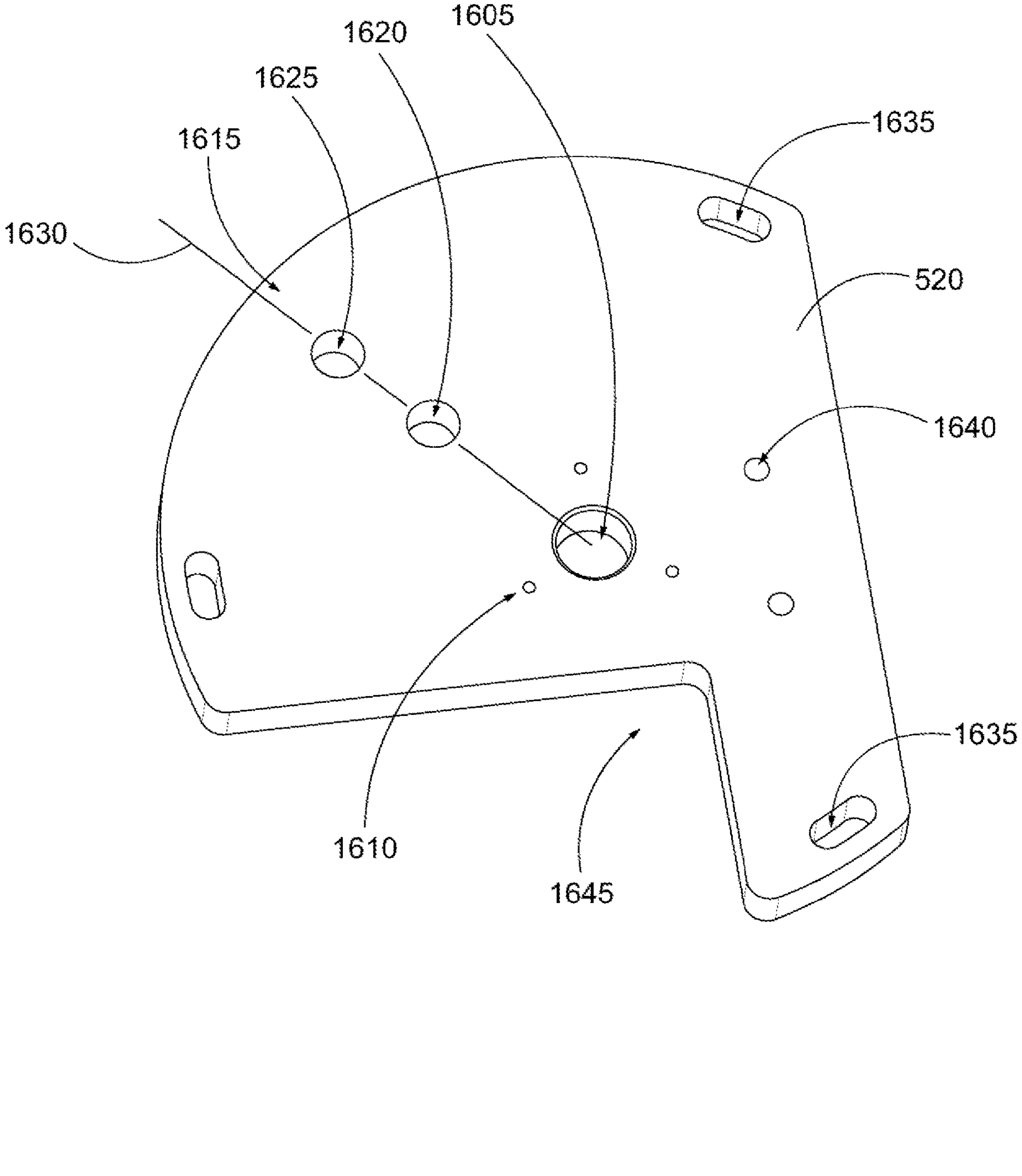
FIG. 16 is a perspective view of a mounting plate used in the homing system of FIG. 5.

A perspective view of the mounting plate 520 is illustrated in FIG. 16. As shown, the mounting plate 520 defines a shaft opening 1605 through which the shaft 1010 of the encoder shaft 510 extends. Around the shaft opening 1605, the mounting plate 520 further defines one or more encoder fastener hole 1610 to which fasteners, such as screws, are used to secure the encoders 550. In the illustrated example, the encoder fastener hole 1610 are used to secure the first rotary encoder 555. The encoder plate 565 further has similar encoder fastener hole 1610 for securing the second rotary encoder 560. It should be recognized that the encoders 550 can be secured in other manners within the homing system 235.

The mounting plate 520 further defines one or more sensor holes 1615 to which the target sensors 535 are secured. In the illustrated example, the sensor holes 1615 includes a first sensor hole 1620 in which the first proximity sensor 540 is secured and a second sensor hole 1625 in which the second proximity sensor 545 is secured. The first sensor hole 1620 and the second sensor hole 1625 are aligned along a sensor alignment line 1630. The sensor alignment line 1630 stretches or is centered on the shaft 1010 of the encoder shaft 510 that extends through the shaft opening 1605. The angular orientation of the sensor alignment line 1630 generally corresponds to the angle of the homing edge 1315 and trailing edge 1320 of the target 515 such that both the first proximity sensor 540 and the second proximity sensor 545 detect one or more of these edges of the target 515 at the same time so as to provide redundancy. For example, even if one of the target sensors 535 fails, the other target sensor 535 is able to provide a backup or safety margin in case of failure.

To adjust the relative angular orientation of the target sensors 535 in the sensor holes 1615, the mounting plate 520 defines one or more adjustment slots 1635 that are configured to receive the fasteners 530 that are used to secure the mounting plate 520 to the adapter plate 320 via the target spacers 525. The adjustment slots 1635 have an oblong shape so as to facilitate this rotational or angular adjustment of the mounting plate 520. The adjustment slots 1635 can be shaped differently in other examples to promote movement of the mounting plate 520 or not. The mounting plate 520 further defines one or more encoder spacer fastener holes 1640 where the fasteners 530 in the encoder spacers 570 are secured. The mounting plate 520 has a generally semicircular shape, but the mounting plate 520 includes an access cutout 1645 so as to facilitate access to the target 515 or other components of the homing system 235.

Figure 17:
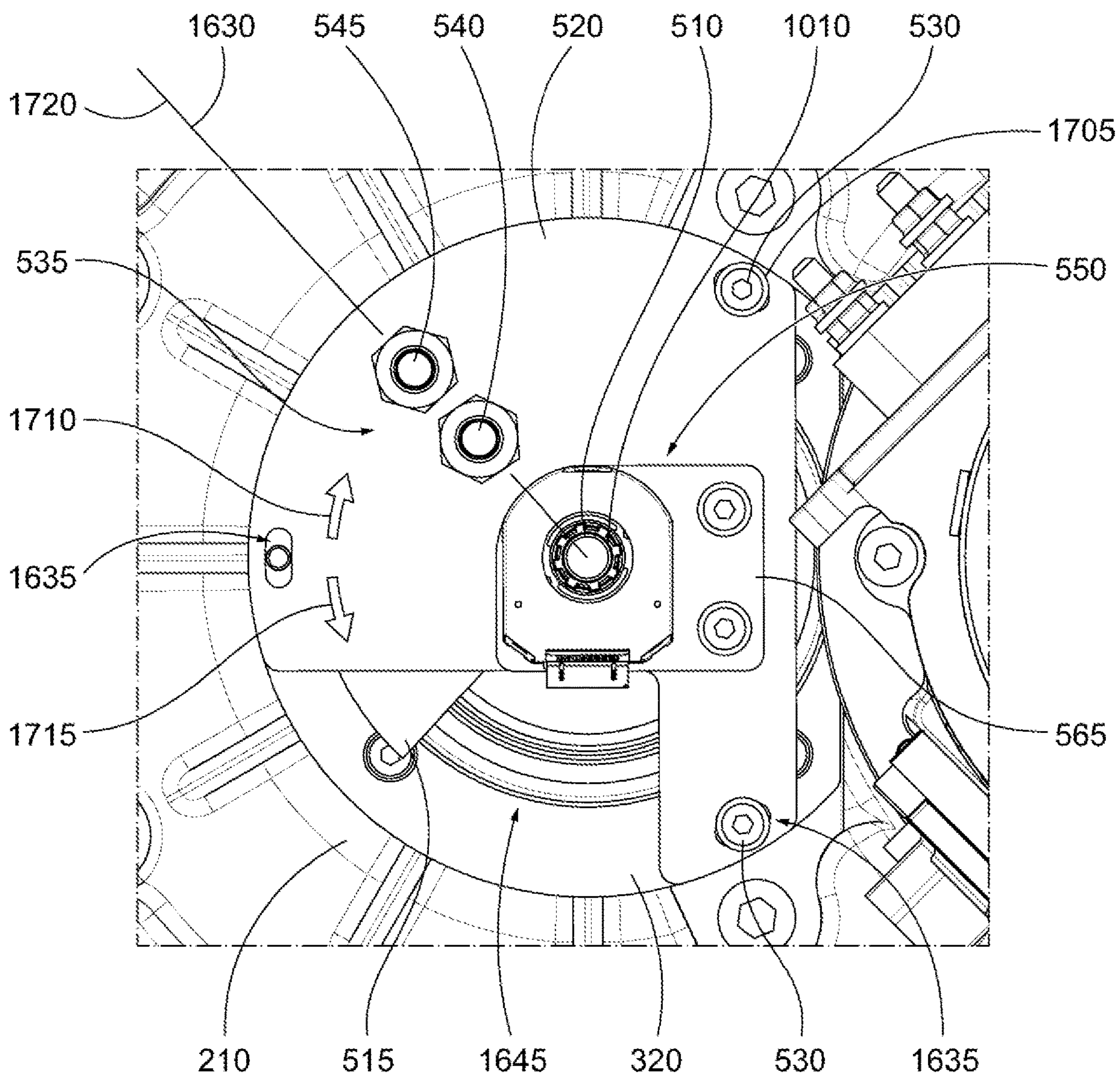
FIG. 17 is a top view of the FIG. 16 mounting plate mounted in the homing system of FIG. 5.

Turn to FIG. 17, the elongated shapes of the adjustment slots 1635 allow the mounting plate 520 to be angularly adjusted so as to align the target sensors 535 appropriately. Once the appropriate position or desired position is achieved, the fasteners 530 can be tightened so as to secure the mounting plate 520 in place. In some cases, washers 1705 may be used to provide further spacing or to provide further security for the fasteners 530 at the adjustment slots 1635. For instance, the mounting plate 520 can be rotated in a clockwise direction 1710 or a counterclockwise direction 1715 so that the target sensors 535 on the sensor alignment line 1630 are aligned at a home position 1720. The home position 1720 represents the ideal location where the steer wheels 230 on the steer arm 220 are oriented to be straight relative to the forklift 105. Once the home position 1720 is achieved, the fasteners 530 can be tightened to secure the mounting plate 520 in place so that the first proximity sensor 540 and the second proximity sensor 545 are oriented properly.

Figure 18:
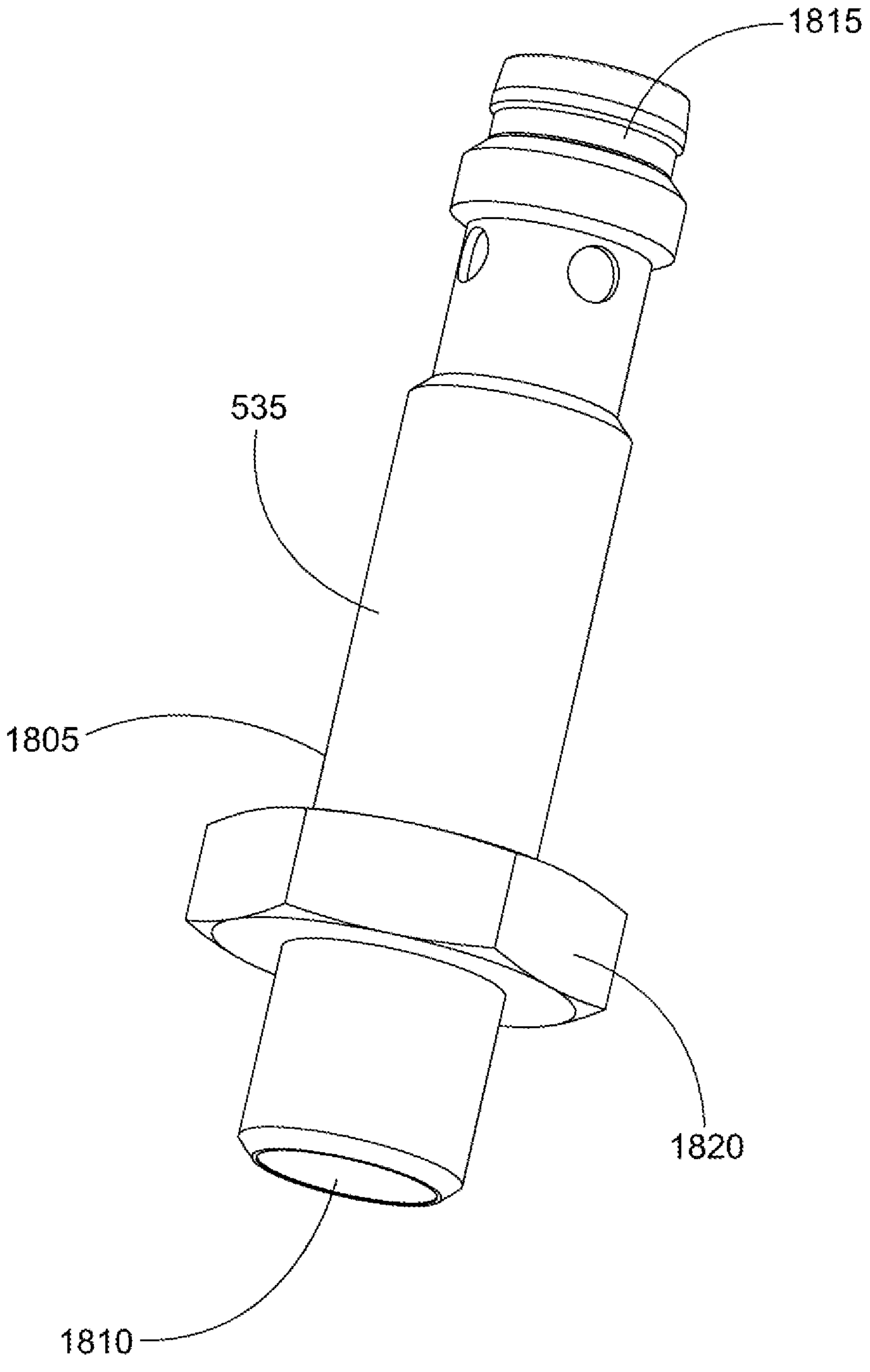
FIG. 18 is a perspective view of a target sensor used in the homing system of FIG. 5.

In most cases, the first proximity sensor 540 and the second proximity sensor 545 are the same type of proximity sensor, such as an inductive type proximity sensor, but in some cases, the first proximity sensor 540 and the second proximity sensor 545 can be different. For example, one of the target sensors 535 can be an inductive type proximity sensor and the other target sensor 535 can be a capacitive or optical type sensor. FIG. 18 shows a perspective view of one of the target sensors 535. Both of the target sensors 535 in one version are again the same and constructed in the manner as illustrated in FIG. 18. For explanation purposes, the target sensor 535 in FIG. 18 will be described as an inductive type proximity sensor, but other types of target sensors 535 have a similar overall structure.

The target sensor 535 in FIG. 18 has a sensor housing 1805. At one end, the target sensor 535 has a sensing face 1810 that is configured to sense the target 515. When in the form of an inductive proximity sensor, the target sensor 535 at the sensing face 1810 has one or more inductive coils that generate an electromagnetic field. Based on changes in the electromagnetic field, the target sensor 535 via the sensing face 1810 is able to detect the target 515. At the end opposite the sensing face 1810, the target sensor 535 has a connector 1815 to which one of the wires 250 is connected. The wire 250 is in turn connected to the controller 240. In one case, the sensor housing 1805 includes threading to which an adjustment nut 1820 is thready secured. The adjustment nut 1820 is able to adjust the relative location of the sensing face 1810 to the target 515 so as to help with detection of the target 515.

Figure 19:
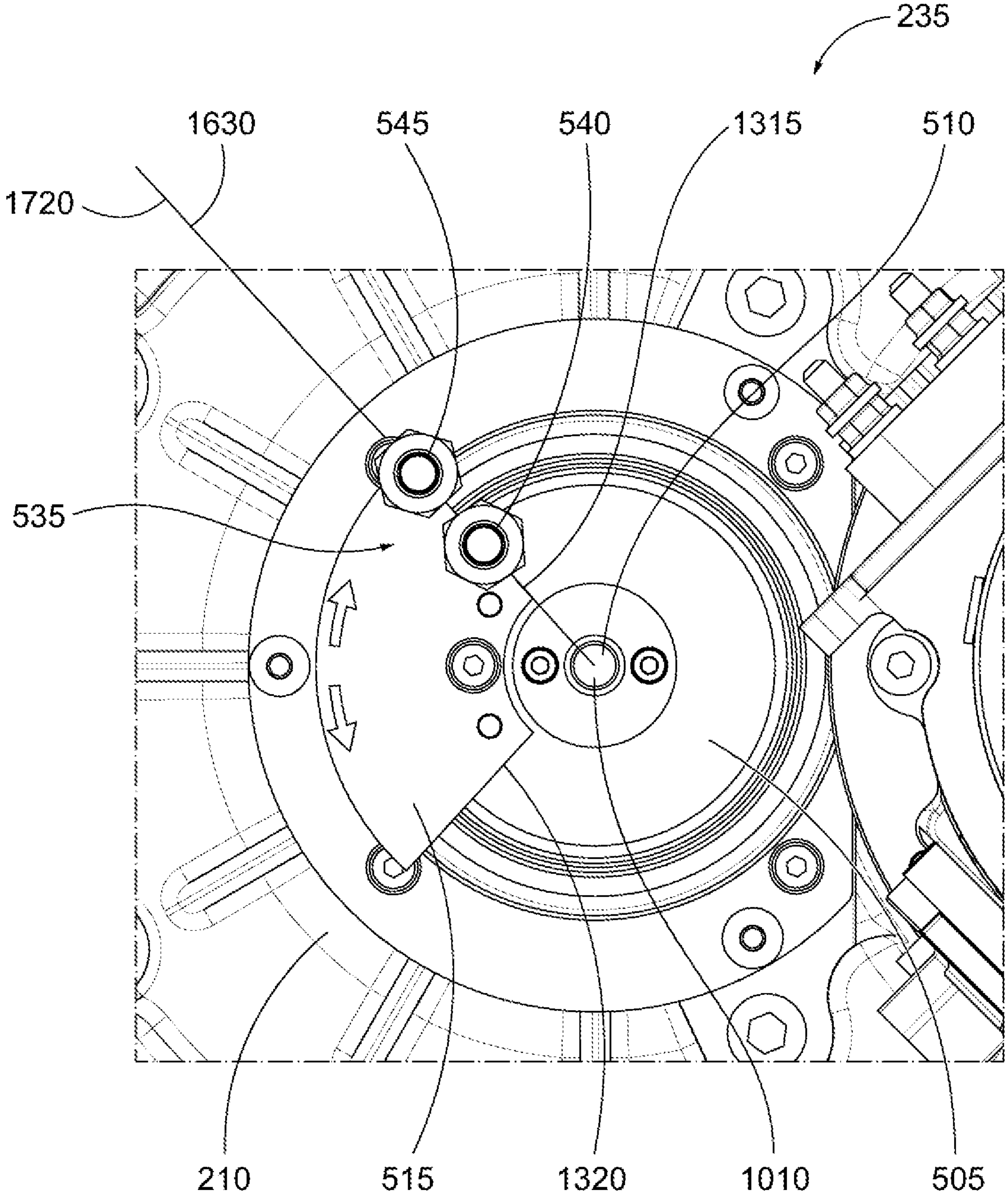
FIG. 19 is a top view of the FIG. 18 target sensors oriented in the homing system of FIG. 5.

FIG. 19 shows a top view of the homing system 235 with selected components, such as the mounting plate 520, removed to improve visibility of the various relative positions of the components of the homing system 235, like the general relative orientation of the target 515 and the target sensors 535. In the illustrated example, the first proximity sensor 540 and the second proximity sensor 545 are aligned along the sensor alignment line 1630. When the target 515 is rotated to a position where the homing edge 1315 of the target 515 is aligned at the sensor alignment line 1630, the first proximity sensor 540 and the second proximity sensor 545 are able to sense the homing edge 1315. In some cases, this orientation is indicative of the home position 1720.

The ideal home position is where both the actual home location and the detected home location are the same. The sensor changes state when the target is within a specified range of detection or when the target leaves the detection zone. In other detection systems, a single sensor is used to detect the target. Moreover, the encoders within the motor are the ones used to detect the steering angle of the steer wheels. As should be recognized, there is play in the mesh between the motor as well as other components within these older systems that can lead to inaccurate steering angle computations.

As anyone who has used a stud finder to detect a stud within a wall, the detected edge of the stud can vary slightly depending on which direction the stud finder is slid over the wall. In a somewhat analogous manner, these other previous sensor systems detected the target while moving in both directions which creates similar errors in detecting a target. In other words, the sensor would detect the target either moving into a homing location approach via the clockwise or counterclockwise (i.e., anticlockwise) directions.

Once more, there is an inherent error created with such a sensing technique in that there is an error between when the homing direction is determined in the different directions. If the sensor fields of the proximity sensors are not uniform or even, the detection of the target can differ depending on which direction the target is moving. For instance, if the electromagnetic field emanated from an inductive proximity sensor is lopsided in one direction, the target may be detected sooner in one direction rather than the other direction. The error could occur on either side or quadrant of the ideal or true home position which can further compound the errors. In other words, there is a discrepancy between the detected or calculated turning angle and the two true turning angle which can create significant safety concerns for autonomous vehicles, such as for the automated guided forklift 110.

This dual direction approach can be compensated for just a single vehicle, but when used for multiple vehicle installations, there are significant challenges that require keeping track of the offsets used in each vehicle. The manufacturing process is used for all vehicles must ensure that all of the vehicles behave the same so as to ensure that overall system performance does not suffer. In this dual direction homing technique, the error can change during every boot cycle of the system. In these previous techniques, the error could have moved from a first quadrant to a second quadrant or vice versa. Every time the system is rebooted, there is a fifty-percent chance that a new offset or error would occur. For instance during vehicle setup, an error may occur in a first quadrant when the power is turned on. Offsets would then be applied based on this error in the first quadrant. However, during the next power boot up, the error could now be located within the second quadrant which basically nullifies the previously set offset. This uncertainty during booting can be a significant safety concern.

The homing system 235 addresses these as well as other issues. The homing system 235 provides a repeatable approach in that the proximity sensor field does not add error because a single direction approach is used. Even if the electromagnetic fields produced by the target sensors 535 are not uniform or are otherwise inconsistent, by having the home angle determined by the target 515 rotating in a single direction (e.g., a clockwise direction) this unevenness will not detrimentally impact the measured angle. The target 515 is shaped and sized so that the controller 240 is aware of which quadrant the target 515 is located. This in turn allows the homing sequence to always occur in one direction. Any error in the detection of the target is now in one quadrant such that the discrepancy can be quickly compensated through a mechanical adjustment and/or electronic adjustment via an offset value. In contrast to the earlier designs where the encoders within the motor were used to determine the turning angles, the encoders 550 in the illustrated example directly measure the turning angle of the steer arm 220 via the shaft 1010 of the encoder shaft 510.

In one example, the first proximity sensor 540 and the second proximity sensor 545 are two flush type inductive proximity sensors. In one particular example, the target sensors 535 are flush type inductive proximity sensors that have an 8 mm diameter. As will be explained further below, the target sensors 535 are used in a single direction approach of detection which leads to increased precision of detecting the target. The homing sequence is done in a single direction. The mounting plate 520 facilitates adjustably mounting of the target sensors 535. The mounting plate 520 can be adjusted to set the steering wheel to true during mechanical installation. This in turn removes any discrepancies caused by any individual differences between or adjustments of the target sensors 535. To adjust the mechanical home position during boot up, both target sensors 535 are moved together by turning the mounting plate 520. Moreover, the design of the homing system 235 provides a cost-effective approach. Instead of using safety rated proximity sensors which typically will cost more than 10 times the cost of using the target sensors 535, the first proximity sensor 540 and the second proximity sensor 545 are used. The redundancy provided by the first proximity sensor 540 and the second proximity sensor 545 allows the homing system 235 to have sufficient safety such that the automated guided forklift 110 can safely autonomously operate.

It should be recognized from the discussion above, the homing system 235 provides a simple and robust manufacturing approach. Minimal adjustments are required of adjusting the relative locations of the target sensors 535. The mounting plate 520 just needs to be simply rotated to properly make adjustments to adjust for any offsets between the measured value and the actual home value. The encoders 550 are configured to determine the turning angle of the steer wheels 230. The adjustment of the home angle can occur mechanically, such as using the technique described before by rotating the mounting plate 520, and/or electronically by the controller 240 using an offset value to compensate for the difference between the true home value or home position 1720 and the detected or measured home angle.

This unique single direction homing technique will now be described with reference to flowchart 2000 in FIG. 20 as well as with reference to FIGS. 21, 22, and 23. This homing technique is usually performed when the automated guided forklift 110 is powered on or booted up, but this technique can be used in other situations where the homing direction of the forklift 105 needs to be reset or recalibrated. This technique can be especially helpful when the forklift 105 is the automated guided forklift (AGF) 110. The various acts performed with this technique will usually be performed by the controller 240 in conjunction with the homing system 235, but in other examples, these acts can be performed with other types of systems and components. In stage 2005, the controller 240 monitors the target sensors 535 and the encoders 550. The controller 240 in stage 2010 determines whether or not the first proximity sensor 540 and the second proximity sensor 545 have detected the presence of the target 515. FIG. 21 shows the orientation of the target 515 where the target sensors 535 have detected the target 515 in stage 2010. When the target 515 is detected, the controller 240 via the motor 205 rotates the steer arm 220 in a reset rotational direction, which in this example is the counterclockwise direction 1715. For explanation purposes only, the reset direction in this example is a counterclockwise (CCW) direction, but in other examples, the reset direction can be a clockwise (CW) direction.

The controller 240 via the target sensors 535 in stage 2020 determines whether the target 515 has rotated past so that the homing edge 1315 moved past the first proximity sensor 540 and the second proximity sensor 545 so as to detect a falling edge status of the target 515. If the controller 240 in stage 2020 does not detect the falling edge (i.e., the homing edge 1315) of the target 515, then the controller 240 via the motor 205 continues to rotate the target 515 in the counterclockwise direction (i.e., reset direction) in stage 2015. FIG. 22 shows an exaggerated example where the target 515 was rotated in the reset direction so as to clear the target sensors 535 in stage 2020. In most cases the target 515 will not be rotated to such an extent in stage 2015 and stage 2020, but in some cases it may be rotated to such an extent. FIG. 22 shows an example where the steer arm 220 is initially at a position where the target 515 is not detected by the first proximity sensor 540 and the second proximity sensor 545 in stage 2010. When that occurs, the controller 240 proceeds to stage 2025. In other words, if the target 515 is not detected in stage 2010, such as in the position shown in FIG. 22, the controller 240 proceeds to stage 2025.

Figure 20:
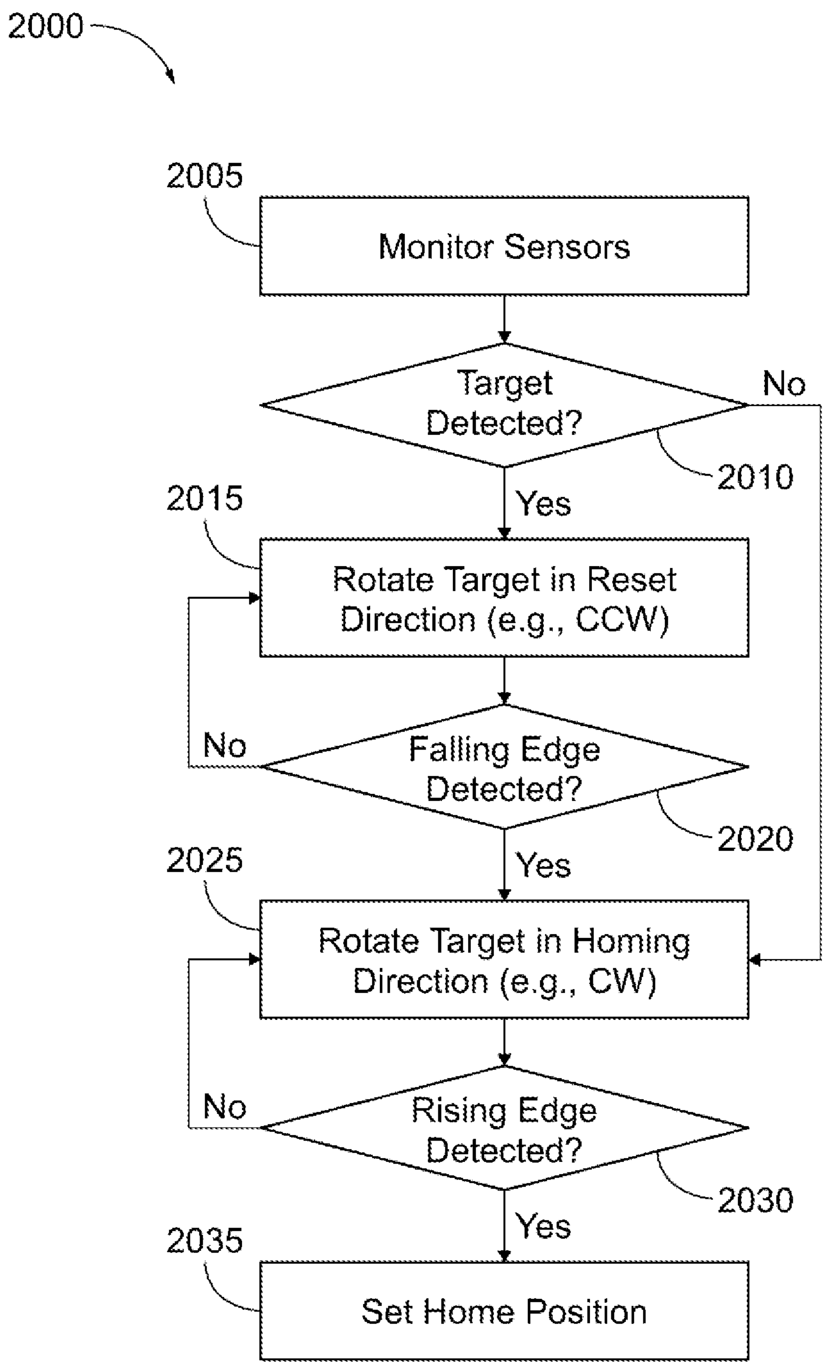
FIG. 20 is a flowchart illustrating a single-direction homing technique according to one example.
Figure 21:
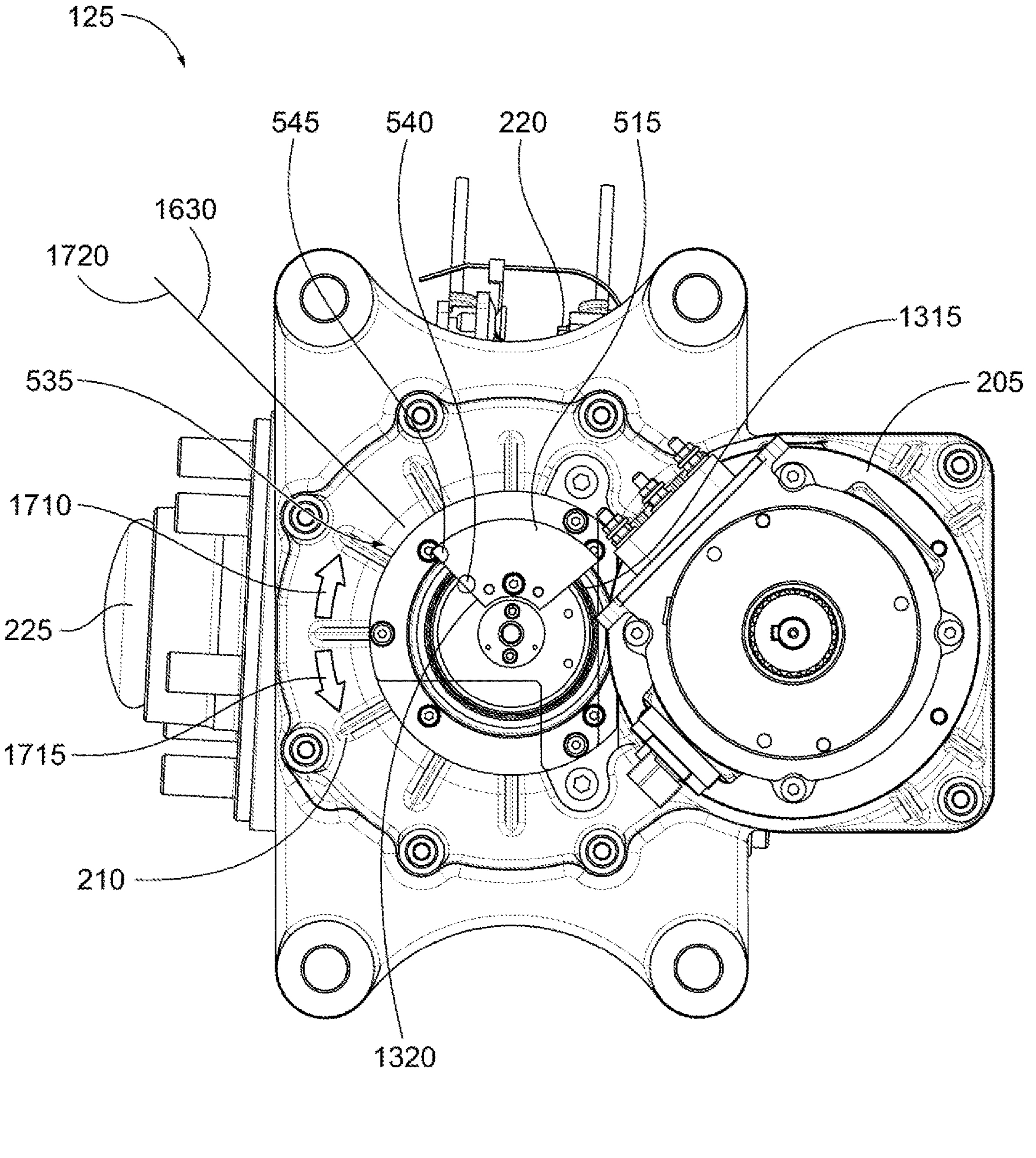
FIG. 21 is a top view of the homing system of FIG. 5 with the FIG. 13 target at a first angular orientation.
Figure 22:
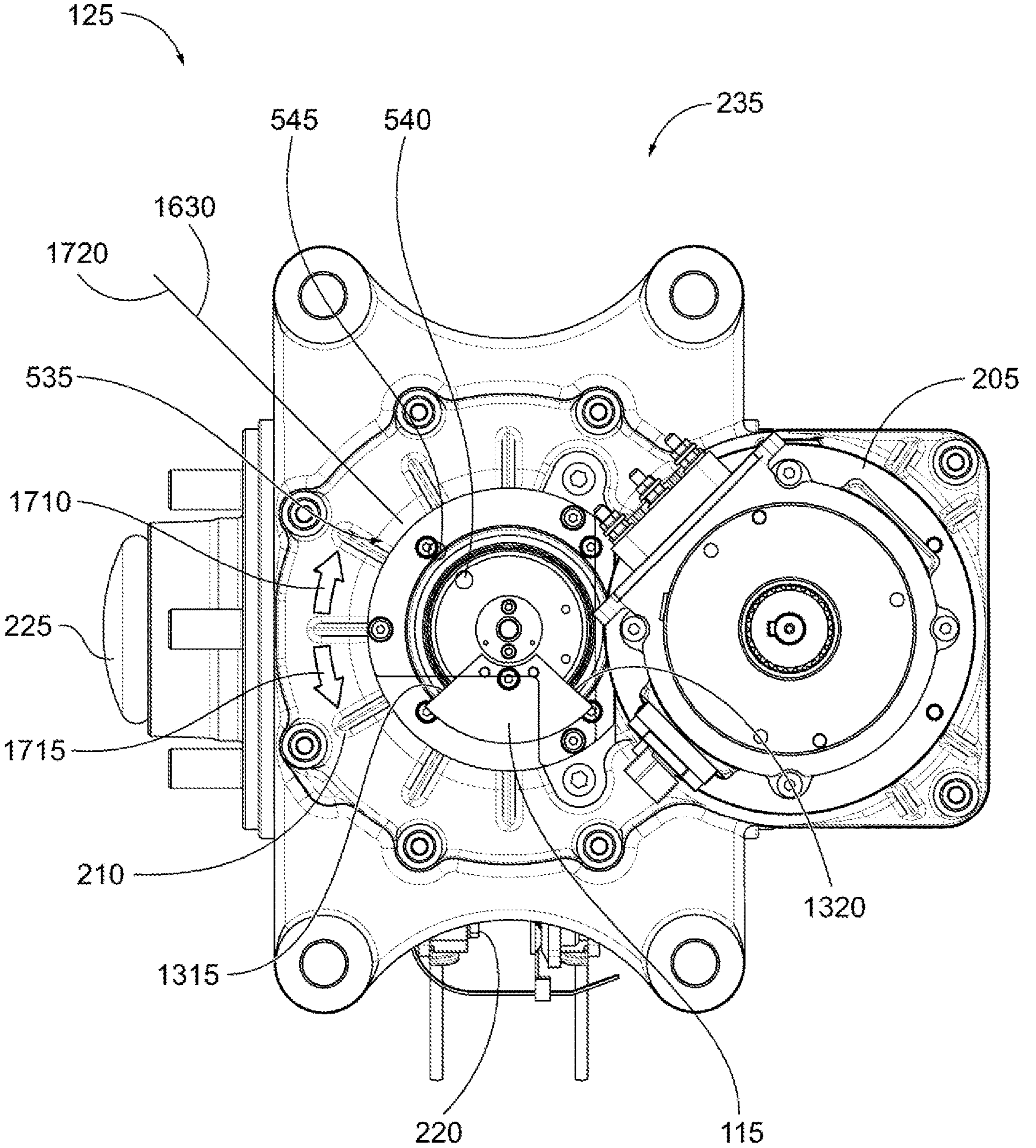
FIG. 22 is a top view of the homing system of FIG. 5 with the FIG. 13 target at a second angular orientation.

Referring to FIGS. 20 and 22, once the target 515 is no longer detected (or was not initially detected), the controller 240 via the motor 205 and the gearbox 210 rotates the steer arm 220 along with the axle 225 in a homing direction. The homing direction is in the opposite rotational direction to the reset direction. In this example, the homing direction is clockwise direction 1710, but in other examples the homing direction can be the counterclockwise direction 1715. As noted before, this technique uses a single homing direction to detect the angular home position of the steer wheels 230 so as to reduce errors. The controller 240 in stage 2025 rotates the steer arm 220 in the homing direction (e.g., the clockwise direction 1710). While this is occurring, the controller 240 via the homing system 235 is monitoring for the presence of the target 515 in stage 2030. When the rising edge of the target 515, which in this case would be the homing edge 1315, is not detected in stage 2030, the controller 240 continues to rotate the steer arm 220 in the homing or clockwise direction 1710 in stage 2025.

Figure 23:
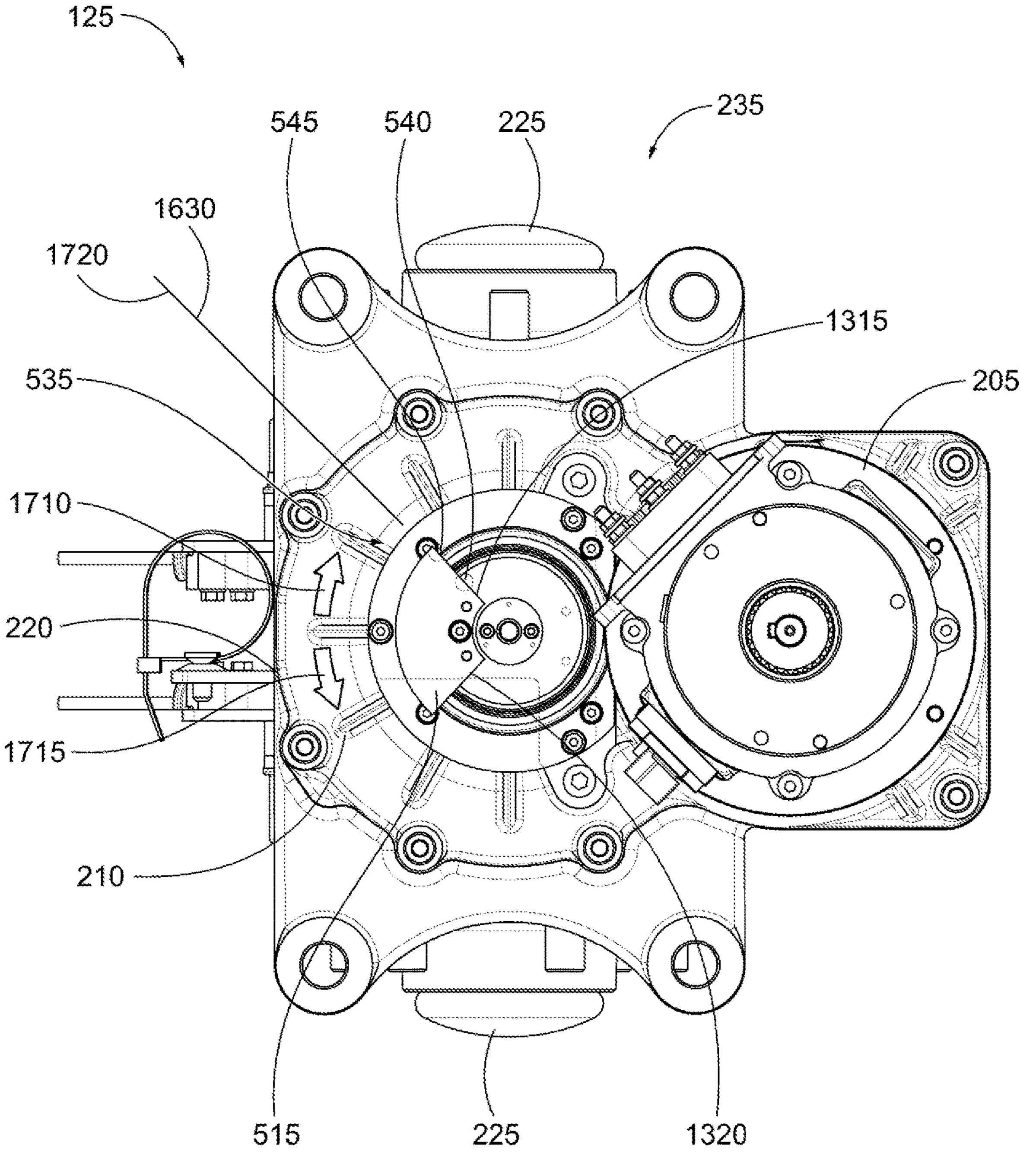
FIG. 23 is a top view of the homing system of FIG. 5 with the FIG. 13 target at a third angular orientation.

FIG. 23 shows the situation where the rising edge, which in this case is the homing edge 1315 of the target 515, reaches the first proximity sensor 540 and the second proximity sensor 545 in stage 2030 of FIG. 20. This is indicative of the steer wheels 230 of the steering system 125 being at the home position 1720 where the steer wheels 230 will move the forklift 105 in straight forward and backwards directions (i.e., not turning). While the controller 240 is rotating the steer arm 220, the controller 240 monitors the relative turning of the steer arm 220 via the encoders 550. As mentioned before, the encoders 550 includes the first rotary encoder 555 and the second rotary encoder 560 so as to provide redundancy and enhance accuracy of determining the actual angular location of the steer wheels 230. As noted before, the encoders 550 are measuring the actual turning of the steer arm 220 and are not present within the motor so as to avoid errors caused by meshing discrepancies in the various components of the motor 205 and the gearbox 210. In stage 2035, the controller 240 based on the information from the target sensors 535 and the encoders 550 sets the home position 1720 for the system 100. Based on this information, a technician can mechanically set the homing position in the manner as described above by rotating the mounting plate 520. Alternatively or additionally, the controller 240 can simply include an offset value to adjust for any discrepancies between the true homing position and the current measured angular position of the steer wheels 230.

Figure 24:
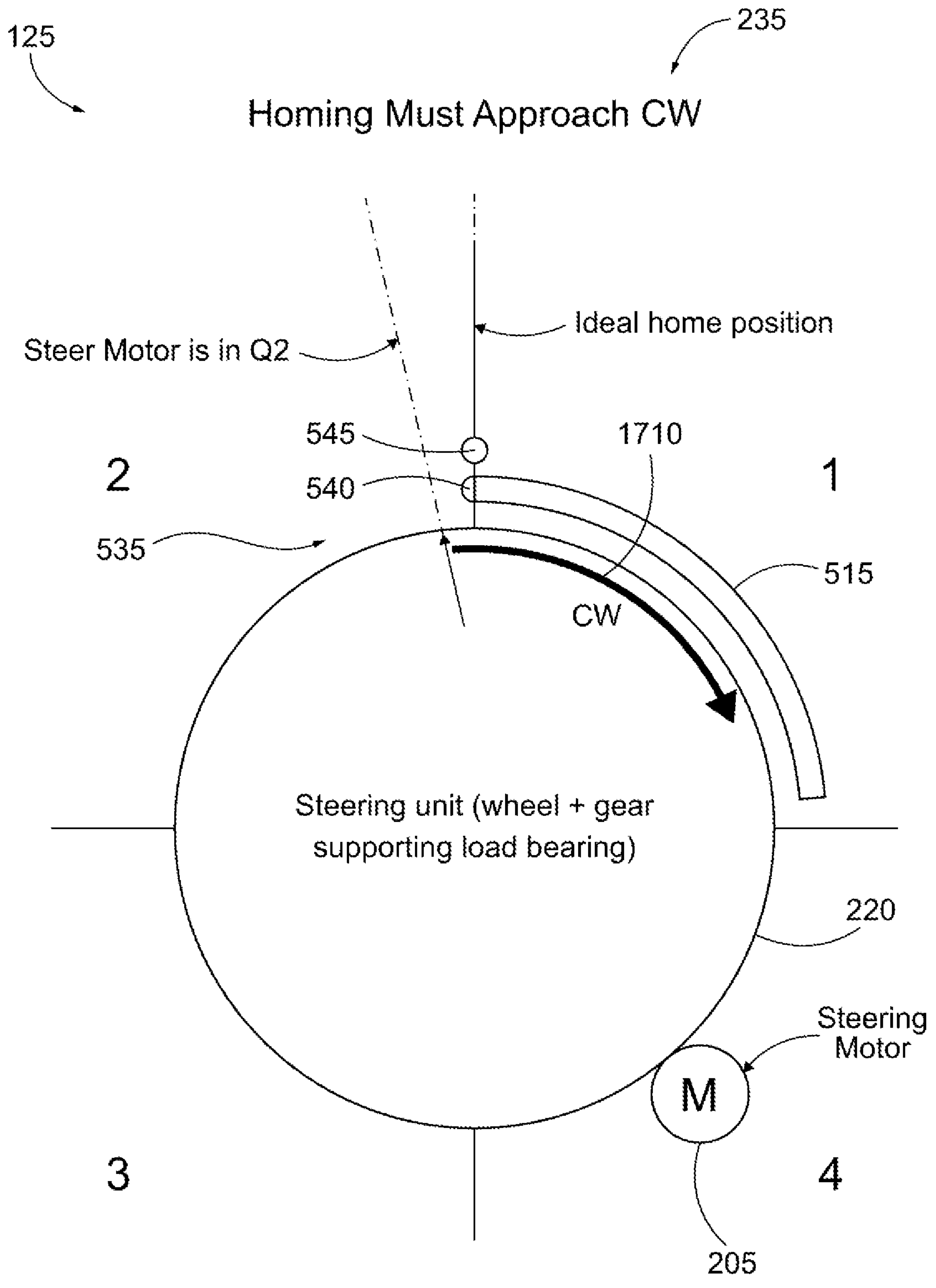
FIG. 24 is a block diagram of the homing system of FIG. 5 in one configuration.

FIG. 24 illustrates a diagrammatic example of where the target 515 is not detected in stage 2010 of the flowchart 2000 in FIG. 20. The axis in FIG. 24 represents the various quadrants (i.e., first, second, third, and fourth quadrants) where the steer arm 220 is oriented. When the target 515 is not detected in stage 2010, the controller 240 proceeds to stage 2025 so as to start rotating the steer arm 220 in the homing direction, which in this case is the clockwise direction 1710. The controller 240 detects the rising edge of the target 515 with the target sensors 535 in stage 2030, and the controller 240 sets the homing position in stage 2035 in the same manner as described above in stage 2035 using the encoders 550.

Figure 25:
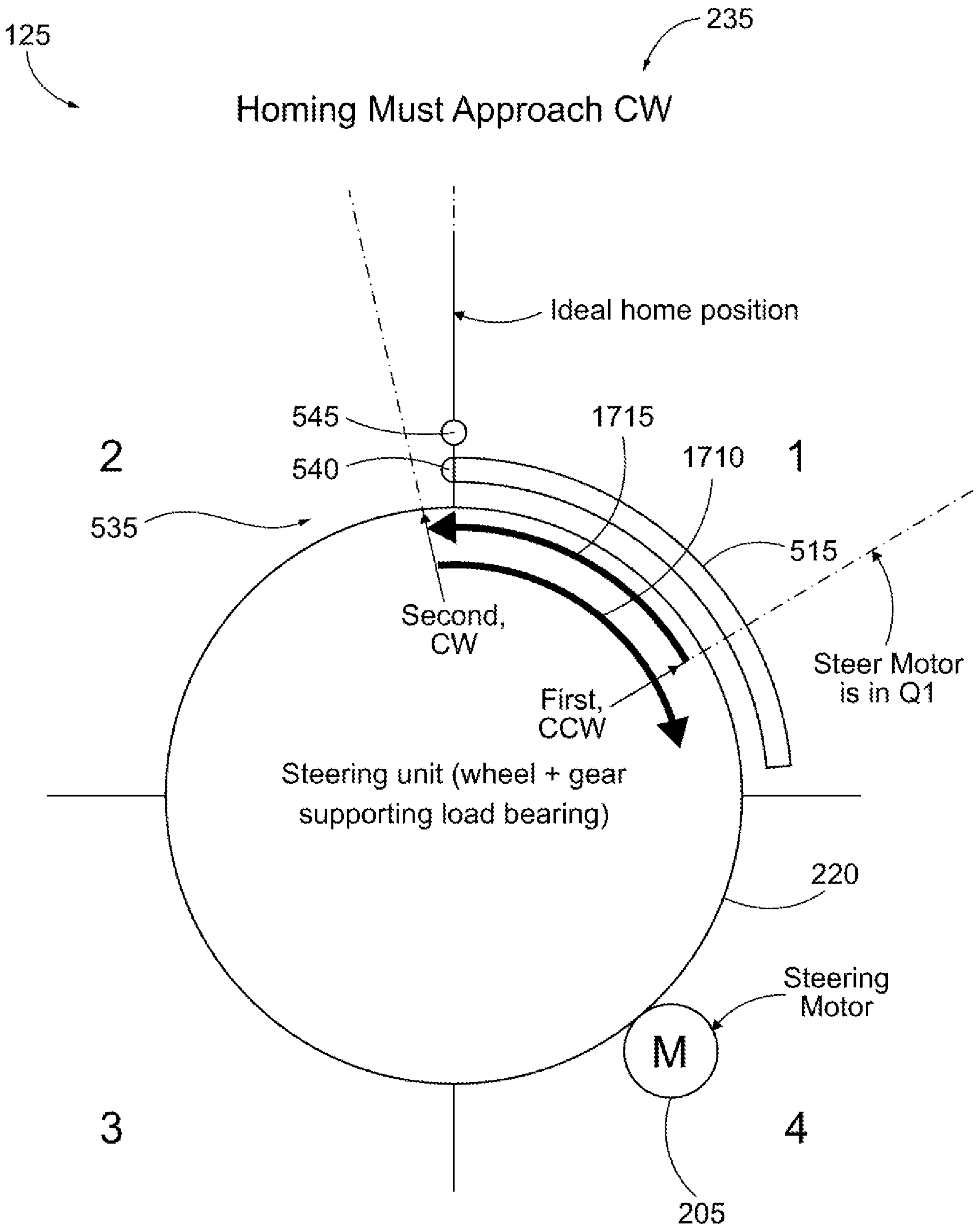
FIG. 25 is another block diagram of the homing system of FIG. 5 in another configuration.

FIG. 25 shows a diagrammatic example of where the target 515 is detected in stage 2010 of the flowchart 2000 in FIG. 20. When that occurs, the controller 240 rotates the steer arm 220 in the reset direction (e.g., the counterclockwise direction 1715) in stage 2015 until the falling edge of the target 515 is detected in stage 2020. Upon detecting the falling edge, the controller 240 rotates the steer arm 220 in the homing direction (e.g., the clockwise direction 1710) in stage 2025. Once the controller 240 detects the rising edge of the target 515 with the target sensors 535 in the homing system 235, the controller 240 via the encoders 550 sets the homing position in stage 2035 in the same manner as described above.

Figure 26:
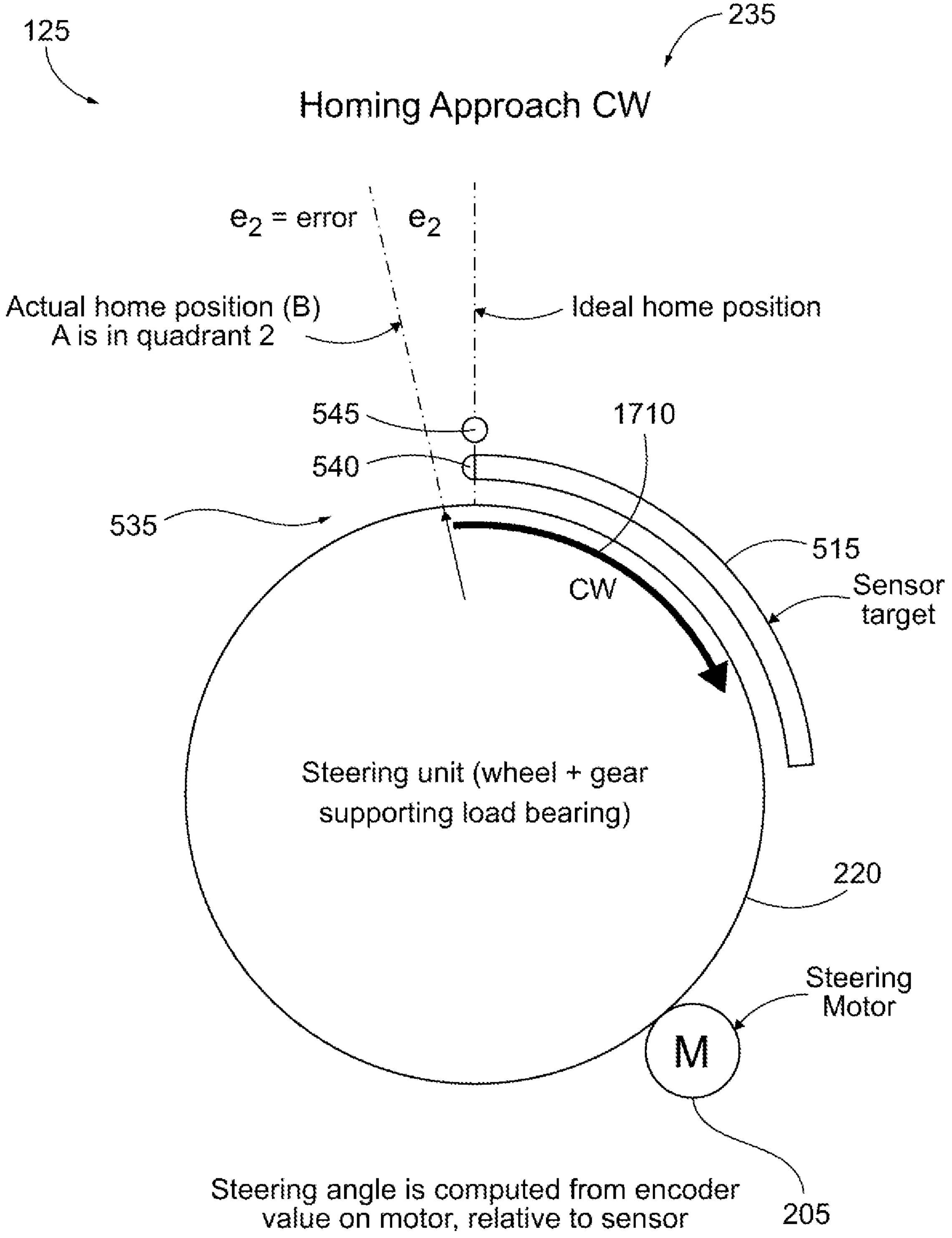
FIG. 26 is a further block diagram of the homing system of FIG. 5 in a further configuration.
Figure 27:
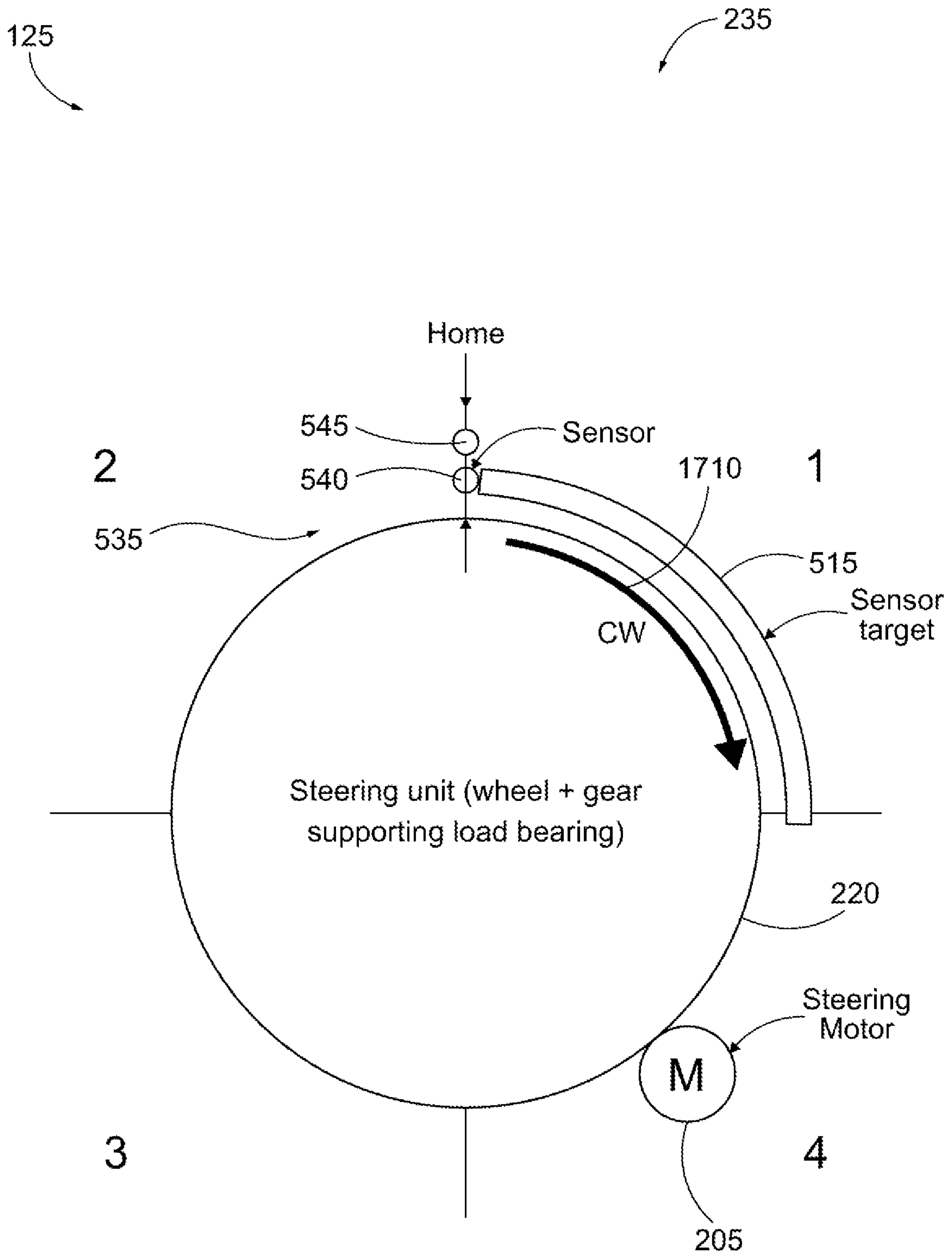
FIG. 27 is a block diagram of the homing system of FIG. 5 in still yet another configuration.

As noted before, based on the shape of the target 515, the controller 240 is aware of which quadrant the target 515 is located. This in turn enables the homing sequence to always occur or approach in one direction. As depicted in FIG. 26, there may be an error or discrepancy between the ideal home position and the actual home position. The steering angle is computed from the values from the encoders 550 relative to the target sensors 535. With the above described technique, any error is now in a single quadrant, as is shown by the quadrants in FIG. 27 such that this error can be compensated with a quick mechanical adjustment by a technician and/or an offset value within the controller 240.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Automated Guided Vehicle" (AGV) generally refers to a mobile robot that is able to automatically self-navigate between various locations. For example, AGVs are typically, but not always, able to automatically navigate by following markers, such as wires or magnets embedded in the floor, by using lasers, and/or by using one or more vision systems. AGVs are also typically, but not always, designed to automatically avoid collisions, such as with other AGVs, equipment, and personnel. AGVs are commonly, but not always, used in industrial applications to move materials around a manufacturing facility or warehouse.

"Axis" generally refers to a straight line about which a body, object, and/or a geometric figure rotates or may be conceived to rotate.

"Cable" generally refers to one or more elongated strands of material that may be used to carry electromagnetic or electrical energy. A metallic or other electrically conductive material may be used to carry electric current. In another example, strands of glass, acrylic, or other substantially transparent material may be included in a cable for carrying light such as in a fiber-optic cable. A cable may include connectors at each end of the elongated strands for connecting to other cables to provide additional length. A cable is generally synonymous with a node in an electrical circuit and provides connectivity between elements in a circuit but does not include circuit elements. Any voltage drop across a cable is therefore a function of the overall resistance of the material used. A cable may include a sheath or layer surrounding the cable with electrically non-conductive material to electrically insulate the cable from inadvertently electrically connecting with other conductive material adjacent the cable. A cable may include multiple individual component cables, wires, or strands, each with, or without, a non-conductive sheathing. A cable may also include a non-conductive sheath or layer around the conductive material, as well as one or more layers of conductive shielding material around the non-conductive sheath to capture stray electromagnetic energy that may be transmitted by electromagnet signals traveling along the conductive material of the cable, and to insulate the cable from stray electromagnetic energy that may be present in the environment the cable is passing through. Examples of cables include twisted pair cable, coaxial cable, "twin-lead", fiber-optic cable, hybrid optical and electrical cable, ribbon cables with multiple side-by-side wires, and the like.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus, a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using Wi-Fi or other Wireless Local Area Network (WLAN) or a cellular transmitter/receiver to transfer data.

"Couple" or "Coupled" generally refers to an indirect and/or direct connection between the identified elements, components, and/or objects. Often the manner of the coupling will be related specifically to the manner in which the two coupled elements interact.

"Edge" generally refers to a border where an object or area begins or ends. The edge is typically in the form of a line or line segment that is at the intersection of two plane faces or of two planes of an object or space.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operates in the reverse direction, accepting mechanical energy and converting the mechanical energy into electrical energy.

"Encoder" generally refers to a device that converts mechanical motion and/or position into an electrical signal. The resulting electrical signal can be an analog or digital signal. The electrical signal can represent various aspects of the movement, such as position of an object, rotation or the amount of angular movement of the object, speed or velocity of the object, and direction of motion of the object. Encoders can be categorized in a number of ways. For example, encoders can include absolute encoders that provide an absolute position value. Incremental encoders count movement, rather than providing an absolute position value. Linear encoders convert linear position information into electrical signals, and rotary encoders convert rotary position information into electrical signals.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Forklift Truck", "Forklift", or "Fork Truck" generally refers to a vehicle with one or more prongs, blades, forks, or other parts that can be slid into or under loads and then raised or lowered in order to move and/or stack the loads. In a common arrangement, the forklift truck has two forks that can be slid into a pallet that carries a load. The forks are typically raised and lowered along a forklift mast. In certain designs, the mast and/or forks can be tilted so as to better retain the carried load. The forklift truck can be operated by a human operator, semi-autonomously controlled, or even fully autonomous. In one example of a fully autonomous design, the forklift truck is an Autonomously Guided Vehicle (AGV). Forklift trucks can be used in a wide variety of environments, such as in warehouses, lumberyards, manufacturing plants, and shipping depots, to name just a few examples. The forklift trucks can be powered in several manners, such as by using internal combustion engines (e.g., with liquefied petroleum gas, or LPG), via battery-electric powerplants, and/or hydrogen fuel cells. Some non-limiting forklift truck design types include low lift trucks, stackers, reach trucks, side loaders, order-picking trucks, guided very-narrow-aisle trucks, articulated counterbalance trucks, and omnidirectional trucks, to name just a few.

"Hole" generally refers to a hollow portion through a solid body, wall or a surface. A hole may be any shape. For example, a hole may be, but is not limited to, circular, triangular, or rectangular. A hole may also have varying depths and may extend entirely through the solid body or surface or may extend through only one side of the solid body.

"Housing" generally refers to a component that covers, protects, and/or supports another thing. A housing can have a unitary construction or made of multiple components. The housing can be made from the same material or a combination of different materials. The housing can include a protective cover designed to contain and/or support one or more mechanical components. Some non-limiting examples of a housing include a case, enclosure, covering, body, and shell.

"Inductive Proximity Sensor" generally refers to a non-contact sensor that detects nearby metallic or other conductive objects using the principles of electromagnetic induction. The inductive proximity sensor generates an alternating magnetic field around a sensing face or end and detects changes in this field caused by the presence of a metal object. The sensing range of the inductive proximity sensor is dependent on the type of metal being detected. Ferrous metals, such as iron and steel, allow for a longer sensing range, while nonferrous metals, such as aluminum and copper, may reduce the sensing range.

"Item" generally refers to an individual article, object, or thing. Commonly, but not always, items are handled in warehouse and material handling environments. The item can come in any form and can be packaged or unpackaged. For instance, items can be packaged in cases, cartons, bags, drums, containers, bottles, cans, pallets, and/or sacks, to name just a few examples. The item is not limited to a particular state of matter such that the item can normally have a solid, liquid, and/or gaseous form for example.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, a pneumatic piston, a hydraulic piston, and/or an internal combustion engine.

"Opening" generally refers to a space or hole that something can pass through.

"Pin" or "Peg" generally refers to an elongated piece of material such as wood, metal, plastic and/or other material. Typically (but not always), the pin is tapered at one or both ends, but the pin can be shaped differently in other examples. For example, the ends of the pin can be flattened, widened, and/or bent in order to retain the pin. Pins can be used for any number of purposes. For example, the pin can be used in machines to couple components together or otherwise act as an interface between components. Pins can also be used for holding things together, hanging things on, and/or marking a position. Normally, but not always, the pin is a small, usually cylindrical piece. In certain cases, the pin is pointed and/or a tapered piece used to pin down, fasten things together, and/or designed to fit into holes. In other examples, the pin can have a polyhedral shape, such as with a rectangular or triangular cross-sectional shape, or an irregular shape.

"Proximity Sensor" generally refers to a non-contact device that detects the presence, absence, and/or changes in proximity of an object. The proximity sensor can utilize various technologies to emit a signal, such as an electromagnetic field, sound waves, or light, and then analyzes the changes in that signal caused by the presence of the object. This technique allows the proximity sensor to determine the nearness of the object without physically touching the object. Some common types of proximity sensors include capacitive proximity sensors, inductive proximity sensors, sonic proximity sensors, and photoelectric proximity sensors, to name just a few examples.

"Rotary Encoder" generally refers to an electromechanical device that converts rotational motion of a shaft, axle, or other structure into an electrical signal. The electrical signal typically indicates the angular position, speed (velocity), and/or direction of the rotation.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Shaft" generally refers to a part that rotates about a central axis. Shafts are a part of various mechanically rotating devices, such as motors, engines, transmissions, gearsets, and/or other devices. Shafts are usually, but not always, used to transfer mechanical torque between various mechanical components. For example, the shaft of a motor may transfer energy to a transmission, an axle, a wheel, and/or another device. In some cases, the shaft of a device is integrated with other parts of that device. The shaft can be shaped in any number of manners. For instance, the shaft can have a cylindrical or rectangular shape, and the shaft can be hollow or solid.

"Steering System" generally refers to one or more devices and/or linkages that allow a vehicle to follow a desired course. By way of non-limiting examples, the steering system can include active, passive, rear wheel, front wheel, four-wheel, power, steer-by-wire, articulated, speed sensitive, differential, crab, hydraulic, rack and pinion, worm and sector, recirculating ball, Ackerman, and/or Bell-crank type systems, to name just a few.

"Vehicle" generally refers to a machine that transports people and/or cargo. Common vehicle types can include land-based vehicles, amphibious vehicles, watercraft, aircraft, and space craft. By way of non-limiting examples, land-based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

"Wire" generally refers to elongated electrically conductive metal. This includes an individual strand, multiple strands (twisted, braided and/or not), traces, strips and other cross-sectional geometries. In some examples, wire is uninsulated wire, such as bare wire without a coating and/or plating. In other examples, wire is insulated wire with a coating of non-conductive material surrounding the wire. In some examples, insulated wire is coated with plastic, fluoropolymer, and/or rubber materials.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS

100 system
105 forklift
110 automated guided forklift
115 body
120 wheels
125 steering system
130 mast
135 carriage
140 forks
145 item
205 motor
210 gearbox
215 steer unit
220 steer arm
225 axle
230 steer wheels
235 homing system
240 controller
245 cables
250 wires
305 housing
310 cable guide
315 cable ties
320 adapter plate
325 enclosure
330 cover
335 lid
505 shaft adapter
510 encoder shaft
515 target
520 mounting plate
525 target spacers
530 fasteners
535 target sensors
540 first proximity sensor
545 second proximity sensor
550 encoders
555 first rotary encoder
560 second rotary encoder
565 encoder plate
570 encoder spacers
705 rotational axis
805 adapter opening
810 gasket lip
815 housing fastener holes
820 spacer fastener holes
905 steer arm fastener holes
910 shaft protrusion hole
915 shaft fastener holes
920 target fastener hole
925 pin holes
1005 flange
1010 shaft
1015 shaft protrusion
1020 flange fastener holes
1105 steering shaft
1110 teeth
1115 shaft end surface
1120 fastener holes
1125 gasket
1205 housing fasteners
1210 encoder shaft fasteners
1305 inner radial side
1310 outer radial side
1315 homing edge
1320 trailing edge
1325 adapter fastener hole
1330 pin holes
1405 angle
1505 target fastener
1510 pins
1605 shaft opening
1610 encoder fastener hole
1615 sensor holes
1620 first sensor hole
1625 second sensor hole
1630 sensor alignment line
1635 adjustment slots
1640 encoder spacer fastener holes
1645 access cutout
1705 washers
1710 clockwise direction
1715 counterclockwise direction
1720 home position
1805 sensor housing

1810 sensing face
1815 connector
1820 adjustment nut
2000 flowchart
2005 stage
2010 stage
2015 stage
2020 stage
2025 stage
2030 stage
2035 stage

What is claimed is:

1. A system, comprising:

a steering system including a steer arm;

a controller being operatively coupled to the steering system;

a homing system is configured to determine a home position of the steering system;

an encoder shaft coupled to the steer arm to rotate in unison with the steer arm;

wherein the encoder shaft is disposed along a rotational axis of the steer arm;

wherein the homing system includes an encoder;

wherein the encoder is mounted around the encoder shaft;

wherein the encoder is configured to determine monitor angular rotation of the encoder shaft;

a target coupled to the steer arm, wherein the target has a homing edge extending in a radial direction, wherein the homing system includes a proximity sensor configured to detect the homing edge of the target; and a mounting plate where the encoder and the proximity sensor are mounted in a fixed manner.

2. The system of claim 1, wherein:

the controller is configured to rotate the steer arm in a homing direction; and the controller is configured to determine the home position of the steering system based on detection of the target with the proximity sensor and angular orientation information from the encoder.

3. The system of claim 2, wherein the controller is configured to determine an offset value to adjust steering operations based on the home position.

4. The system of claim 1, wherein the encoder is a rotary encoder.

5. The system of claim 1, wherein:

the proximity sensor is a first proximity sensor;

the homing system includes a second proximity sensor;

the first proximity sensor and the second proximity sensor are aligned along a sensor alignment line; and the first proximity sensor and the second proximity sensor are configured to detect the homing edge of the target when the controller rotates the steer arm in a single direction.

6. The system of claim 5, wherein:

the mounting plate defines one or more sensor holes;

the sensor holes include a first sensor hole and a second sensor hole;

the first proximity sensor is mounted in the first sensor hole in the mounting plate; and the second proximity sensor is mounted in the second sensor hole in the mounting plate.

7. The system of claim 6, wherein the mounting plate defines a shaft opening through which the encoder shaft extends.

8. The system of claim 1, wherein:

the steering system includes a motor;

the steering system includes a gearbox; and the homing system is secured to the gearbox.

9. The system of claim 1, wherein:

the proximity sensor is a first proximity sensor;

the homing system includes a second proximity sensor configured to detect the homing edge of the target;

the encoder, the first proximity sensor, and the second proximity sensor are mounted to the mounting plate along a sensor alignment line; and the sensor alignment line has an angular orientation corresponding to the angle of the homing edge.

10. A system, comprising:

a steering system including a steer arm, a controller being operatively coupled to The steering system;

a homing system is configured to determine a home position of the steering system;

wherein the homing system is configured to determine the home position by rotating the steer arm in a single direction;

wherein the homing system includes a target;

wherein the target is coupled to the steer arm;

wherein the homing system includes one or more sensors;

wherein the sensors are configured to detect the target;

wherein the target has a homing edge extending in a radial direction;

wherein the sensors are configured to detect the homing edge of the target when the controller rotates the steer arm in the single direction;

wherein the sensors include a first proximity sensor and a second proximity sensor;

wherein the first proximity sensor and the second proximity sensor are aligned along a sensor alignment line;

wherein the homing system includes a mounting plate;

wherein the mounting plate defines one or more sensor holes;

wherein the sensor holes include a first sensor hole and a second sensor hole;

wherein the first proximity sensor is mounted in the first sensor hole in the mounting plate;

wherein the second proximity sensor is mounted in the second sensor hole in the mounting plate;

wherein the mounting plate defines one or more adjustment slots; and wherein the adjustment slots in the mounting plate are configured to facilitate positional adjustment of the sensors.

11. A system, comprising:

a steering system including a steer arm;

a controller being operatively coupled to The steering system;

a homing system is configured to determine a home position the steering system, wherein the homing system is configured to determine the home position by rotating the steer arm in a single direction, wherein the homing system includes a target;

wherein the target is coupled to the steer arm;

wherein the homing system includes one or more sensors;

wherein the sensors are configured to detect the target;

wherein the target has a homing edge extending in a radial direction;

wherein the sensors are configured to detect the homing edge of the target when the controller rotates the steer arm in the single direction;

wherein the sensors include a first proximity sensor and a second proximity sensor;
wherein the first proximity sensor and the second proximity sensor are aligned along a sensor alignment line;
wherein the homing system includes a mounting plate;
wherein the mounting plate defines one or more sensor holes;
wherein the sensor holes include a first sensor hole and a second sensor hole;
wherein the first proximity sensor is mounted in the first sensor hole in the mounting plate;
wherein the second proximity sensor is mounted in the second sensor hole in the mounting plate;
an encoder shaft being coupled to the steer arm to rotate in unison with the steer arm;
wherein the homing system includes one or more encoders;
wherein the mounting plate defines a shaft opening through which the encoder shaft extends;
wherein the encoder shaft extends through the encoders;
wherein the encoders includes a first rotary encoder and a second rotary encoder;
wherein the first rotary encoder is secured to the mounting plate;
wherein the homing system includes an encoder plate;
wherein the encoder plate is secured to the mounting plate; and
wherein the encoder plate is disposed between the first rotary encoder and the second rotary encoder.

12. A system, comprising:
a homing system including an adapter plate;
wherein the adapter plate defines an adapter opening;
wherein the homing system includes a shaft adapter;
wherein the homing system includes an encoder shaft;
wherein the encoder shaft is secured to the shaft adapter;
wherein the homing system includes a target;
wherein the target is secured to the shaft adapter;
wherein the homing system includes a mounting plate;
wherein the mounting plate is secured to the adapter plate;
wherein the mounting plate defines a shaft opening through which the encoder shaft extends;
wherein the mounting plate defines one or more sensor holes;
wherein the sensor holes include a first sensor hole and a second sensor hole;
wherein the homing system includes one or more encoders;
wherein the encoder shaft extends through the encoders;
wherein the encoders includes a first rotary encoder and a second rotary encoder;
wherein the first rotary encoder surrounds the shaft opening in the mounting plate;
wherein the homing system includes one or more sensors;
wherein the sensors are configured to detect the target;
wherein the sensors include a first proximity sensor and a second proximity sensor;
wherein the first proximity sensor is mounted in the first sensor hole in the mounting plate; and
wherein the second proximity sensor is mounted in the second sensor hole in the mounting plate.

13. The system of claim 12, wherein the first sensor hole and the second sensor hole are aligned along a sensor alignment line that extends in a straight radial direction from the shaft opening.

14. The system of claim 12, wherein:
the target is in the form of a plate; and
the target has an arched shape.

15. A method, comprising:
turning a steering system in a homing direction;
detecting a target rotating with the steering system with a sensor;
monitoring an angular position of the steering system with an encoder;
setting a home position of the steering system to the angular position from the encoder upon the detecting the target with the sensor;
sensing the target with the sensor;
rotating the steering system in a reset direction in response to sensing the target;
wherein the reset direction is opposite to the homing direction;
sensing a falling edge of the target moving in the reset direction with the sensor; and
performing the turning the steering system in the homing direction after the sensing the falling edge of the target.

16. The method of claim 15, further comprising:
determining an offset value based on the home position with a controller; and
turning the steering system at an angle adjusted by the offset value with the controller.

17. The method of claim 15, wherein:
the sensor is a first sensor;
the detecting the target includes detecting the target with the first sensor and a second sensor;
the encoder is a first encoder;
the monitoring the angular position includes monitoring the angular position of the steering system with the first encoder and a second encoder; and
the sensing the falling edge includes sensing the falling edge of the target moving in the reset direction with the first sensor and the second sensor.

18. A method comprising:
turning a steering system of a forklift in a homing direction;
detecting a target rotating with the steering system with at least two sensors;
monitoring an angular position of the steering system with at least two encoders;
setting a home position of the steering system of the forklift to the angular position from the encoders upon the detecting the target with the sensors; and
adjusting the sensors to the home position by rotating a mounting plate to which the sensors are mounted.

19. The method of claim 18, further comprising:
sensing the target with the sensors;
rotating the steering system in a reset direction in response to sensing the target;
wherein the reset direction is opposite to the homing direction;
sensing a falling edge of the target moving in the reset direction with the sensors; and
performing the turning the steering system of the forklift in the homing direction after the sensing the falling edge of the target.

20. A system, comprising:
a steering system including a steer arm;
a controller being operatively coupled to the steering system;
a homing system is configured to determine a home position of the steering system;
wherein the homing system is configured to determine the home position by rotating the steer arm in a single direction;

an encoder shaft coupled to the steer arm to rotate in unison with the steer arm;

wherein the encoder shaft is disposed along a rotational axis of the steer arm;

wherein the homing system includes an encoder;

wherein the encoder is mounted around the encoder shaft;

wherein the encoder is configured to monitor angular rotation of the encoder shaft;

a target coupled to the steer arm;

wherein the target has a homing edge extending in a radial direction from an inner radial side to an outer radial side;

wherein the target extends across at least one rotational quadrant of the steer arm; and wherein the homing system includes a proximity sensor configured to detect the homing edge of the target.

* * * * *